Dec. 25, 1928.　　　　　A. HOFMANN ET AL　　　　　1,696,484
NEEDLE MAKING MACHINE
Filed Nov. 12, 1927　　　25 Sheets-Sheet 1

INVENTORS
BY
ATTORNEY

Dec. 25, 1928.
A. HOFMANN ET AL
1,696,484
NEEDLE MAKING MACHINE
Filed Nov. 12, 1927
25 Sheets-Sheet 2
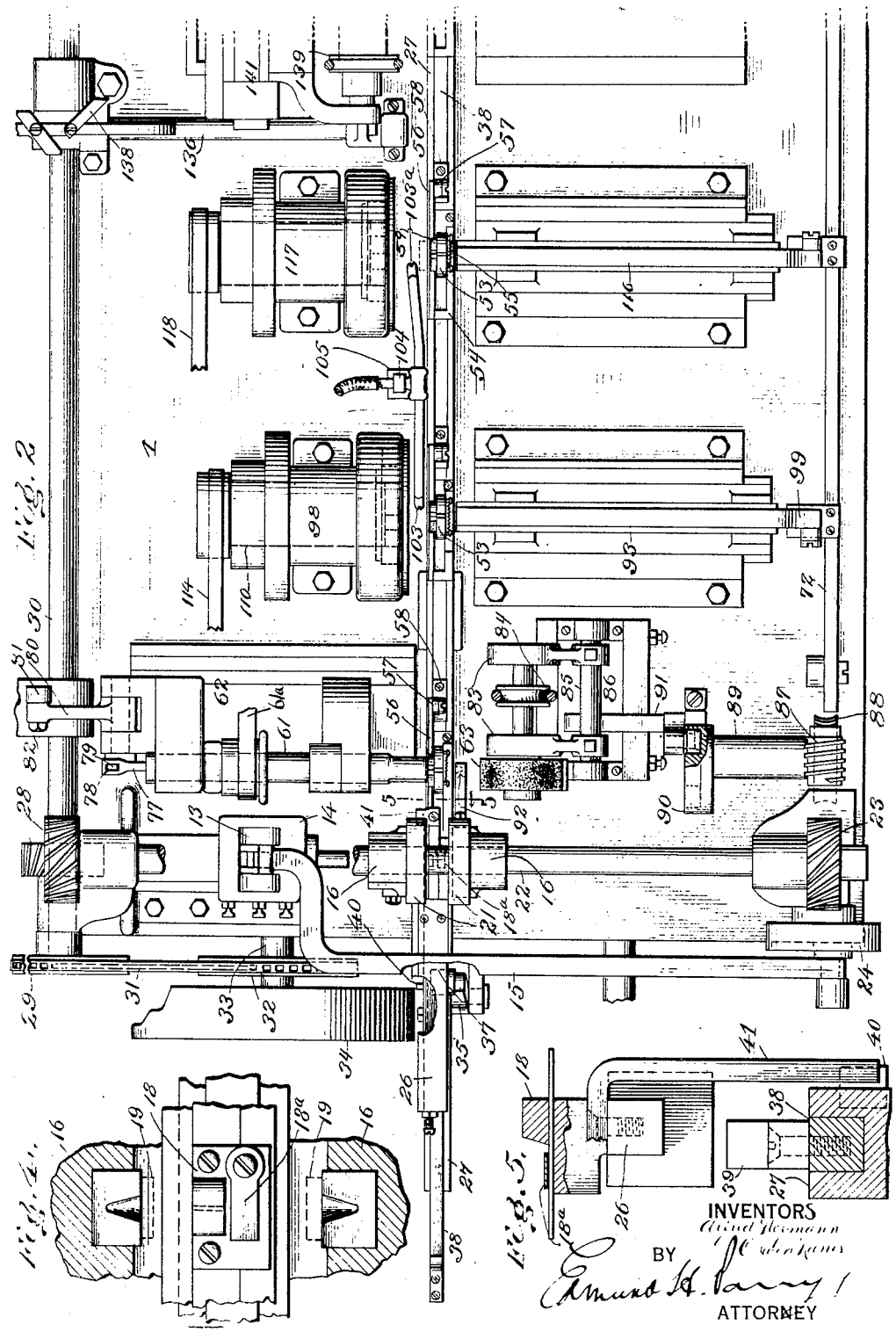
INVENTORS
BY
ATTORNEY

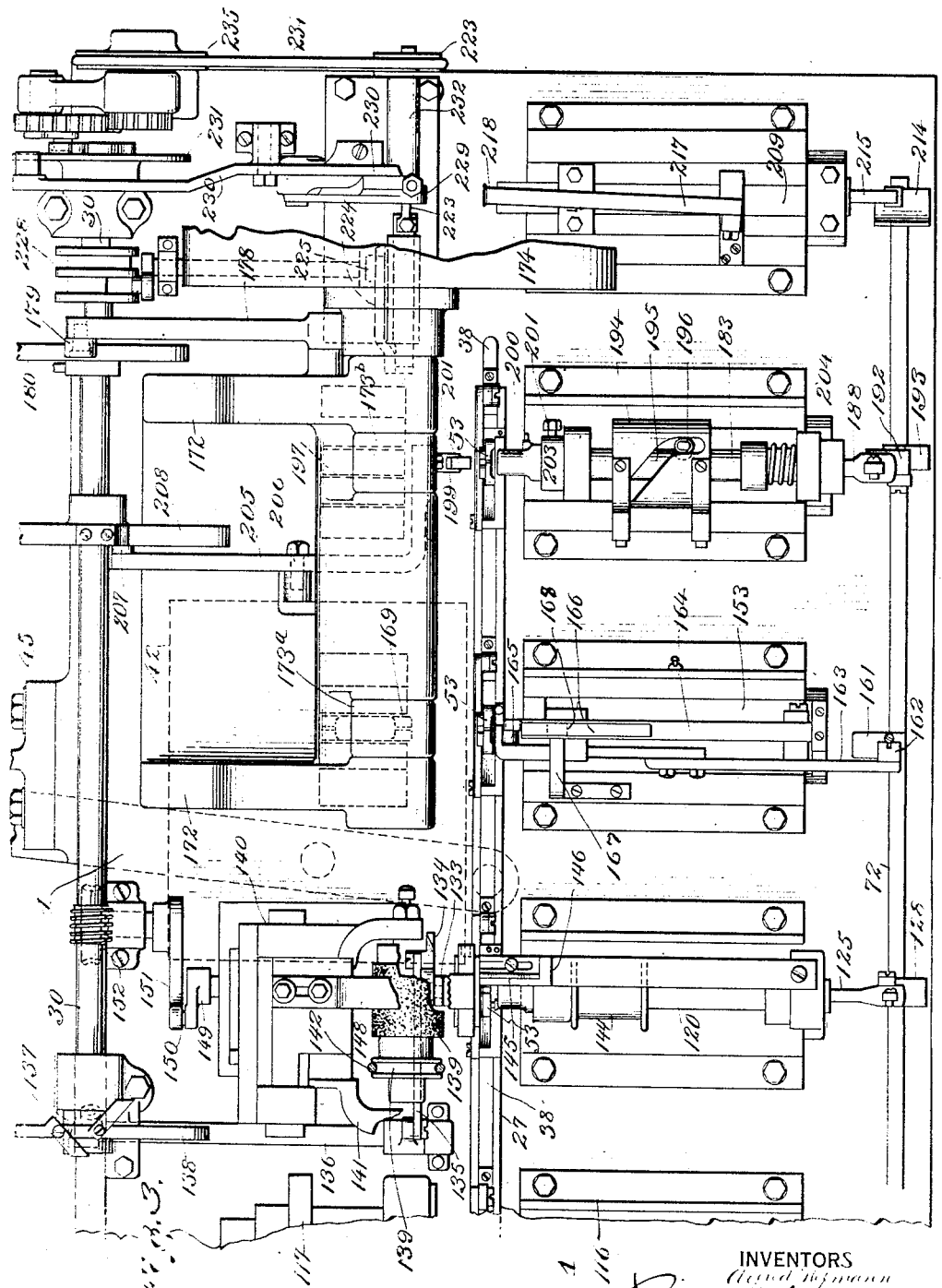

Dec. 25, 1928.
A. HOFMANN ET AL
1,696,484
NEEDLE MAKING MACHINE
Filed Nov. 12, 1927    25 Sheets-Sheet 4
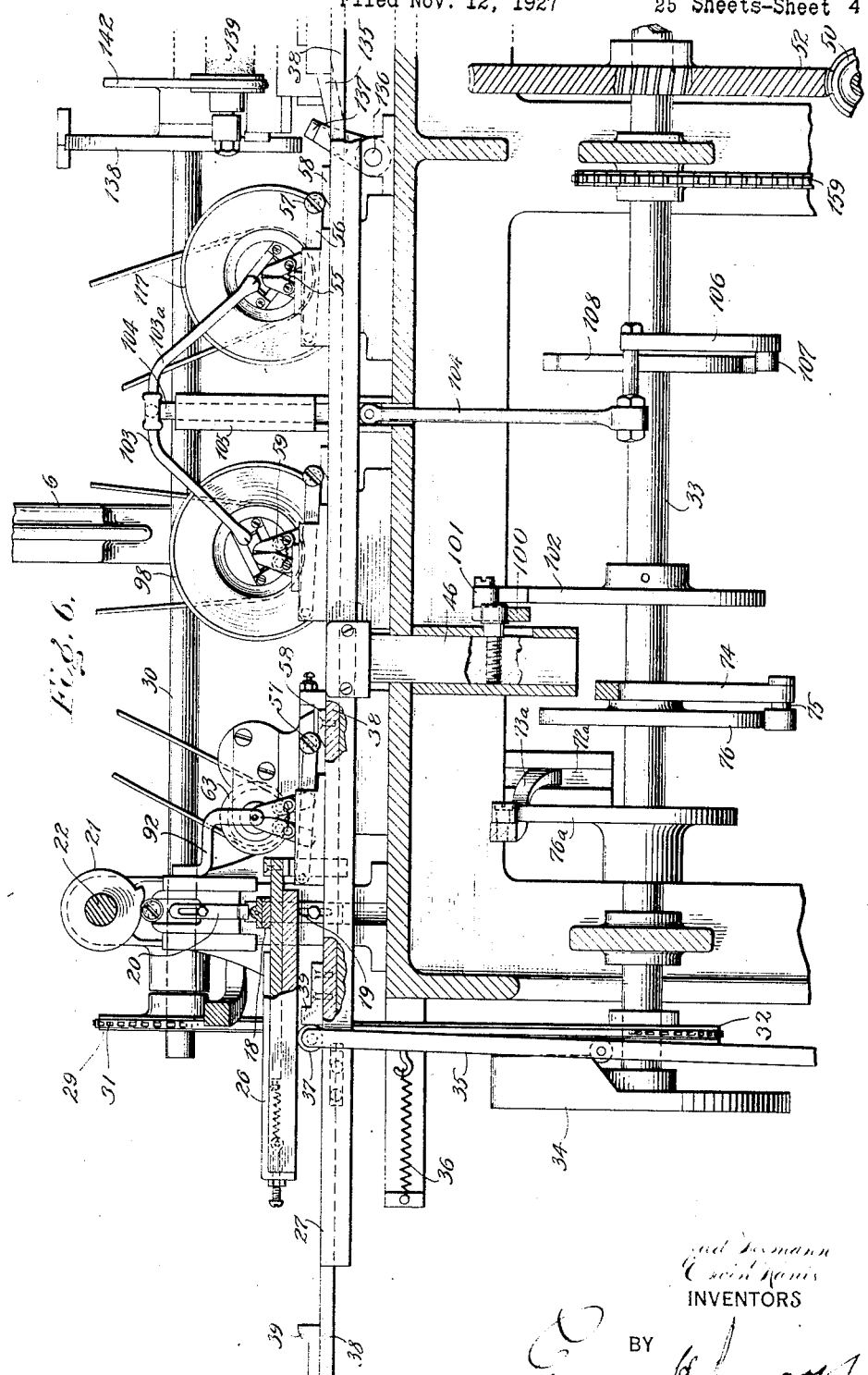

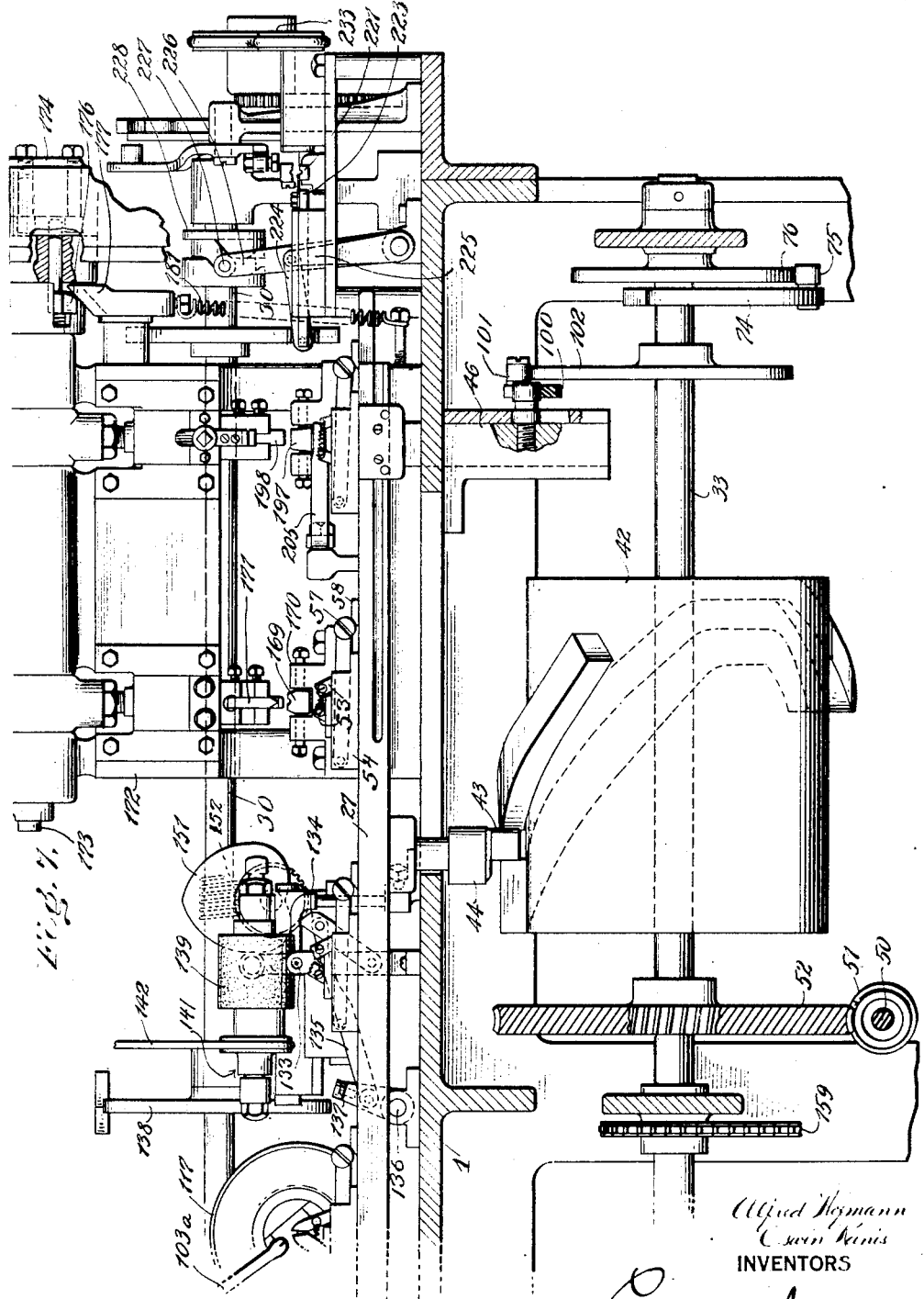

Dec. 25, 1928.
A. HOFMANN ET AL
1,696,484
NEEDLE MAKING MACHINE
Filed Nov. 12, 1927     25 Sheets-Sheet 6
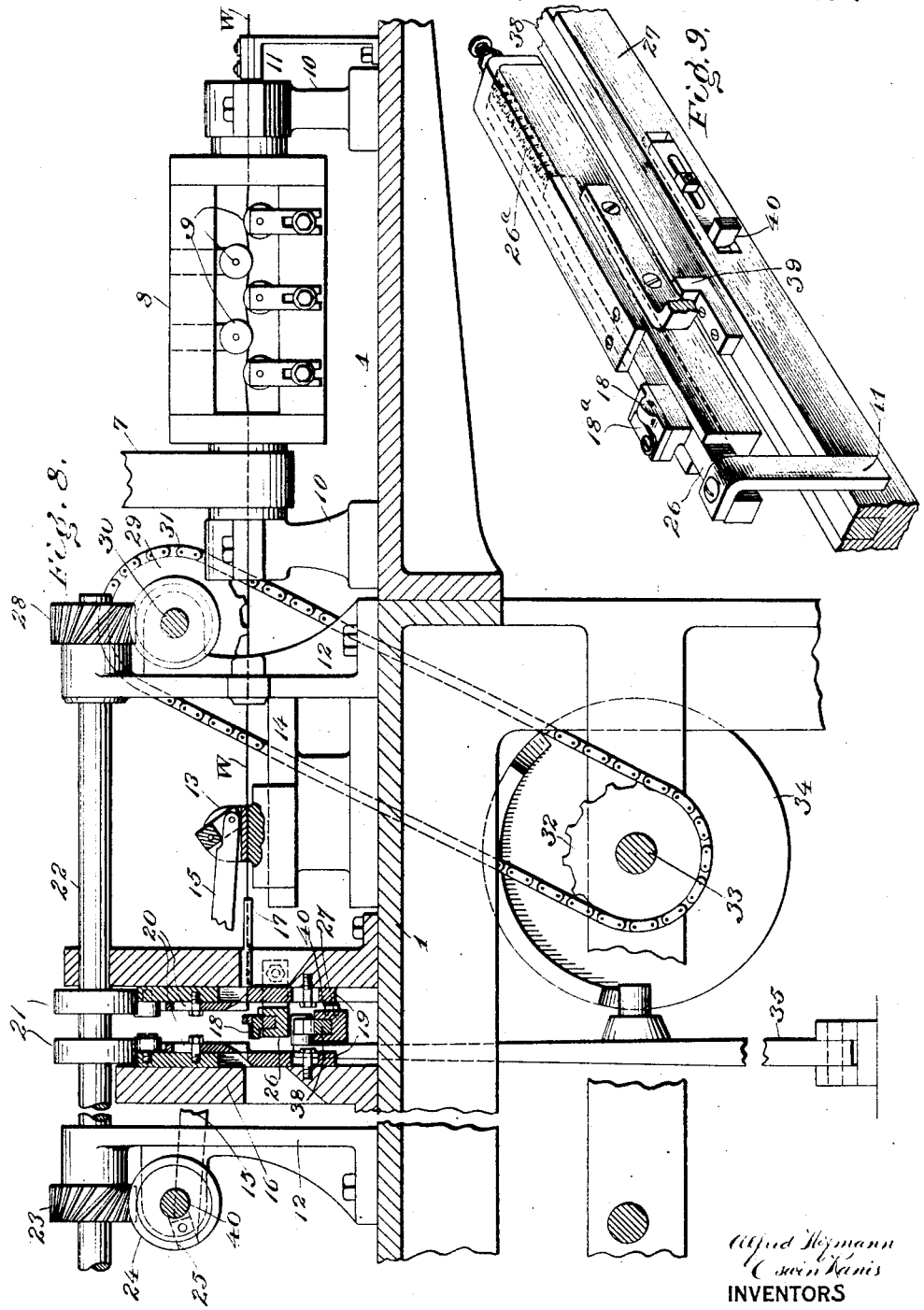
Alfred Hofmann
Oswin Kanis
INVENTORS
BY
ATTORNEY Dec. 25, 1928.
A. HOFMANN ET AL
1,696,484
NEEDLE MAKING MACHINE
Filed Nov. 12, 1927     25 Sheets-Sheet 7
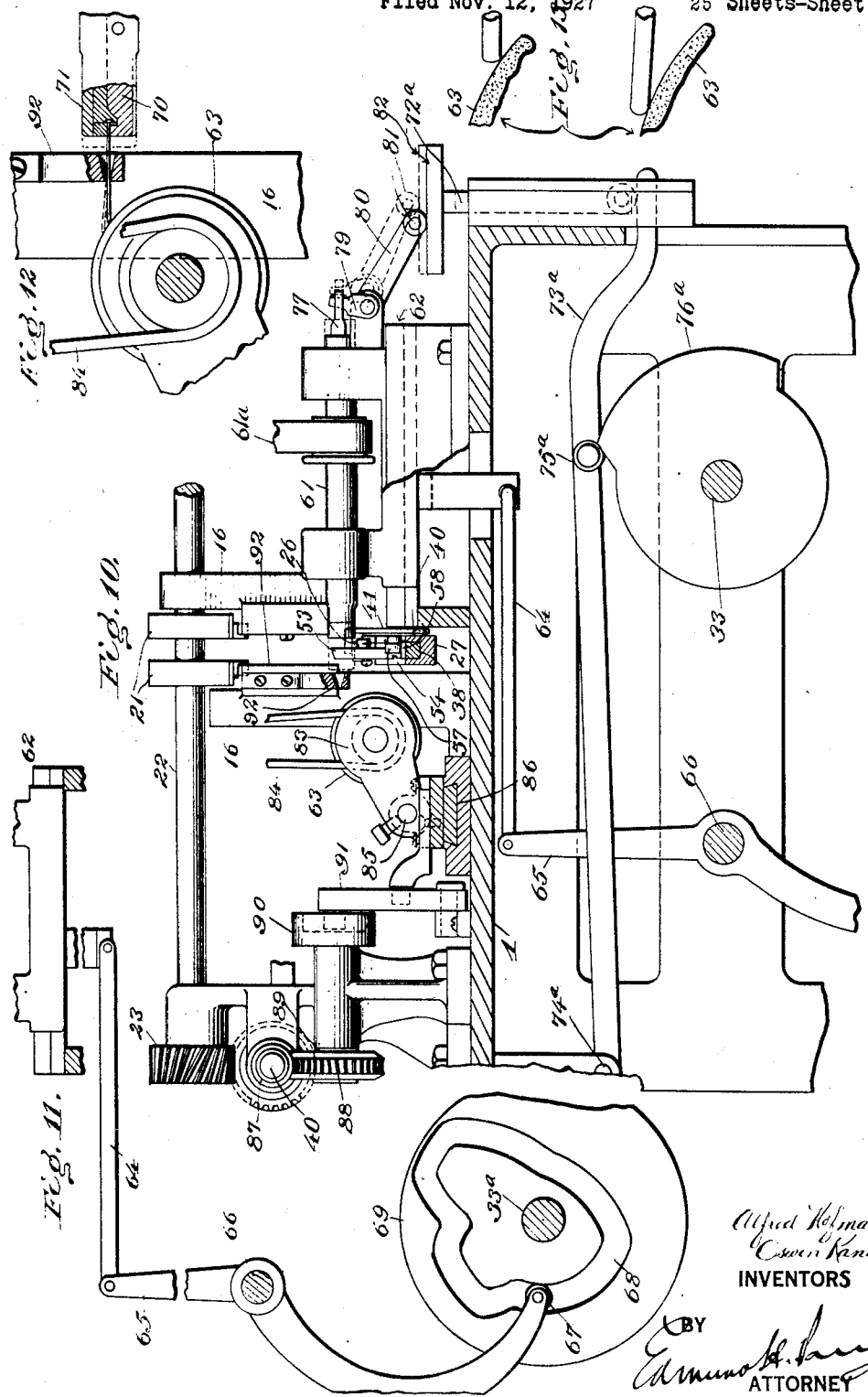
Alfred Hofmann
Oswin Kanis
INVENTORS
BY
Edmund H. Parry
ATTORNEY

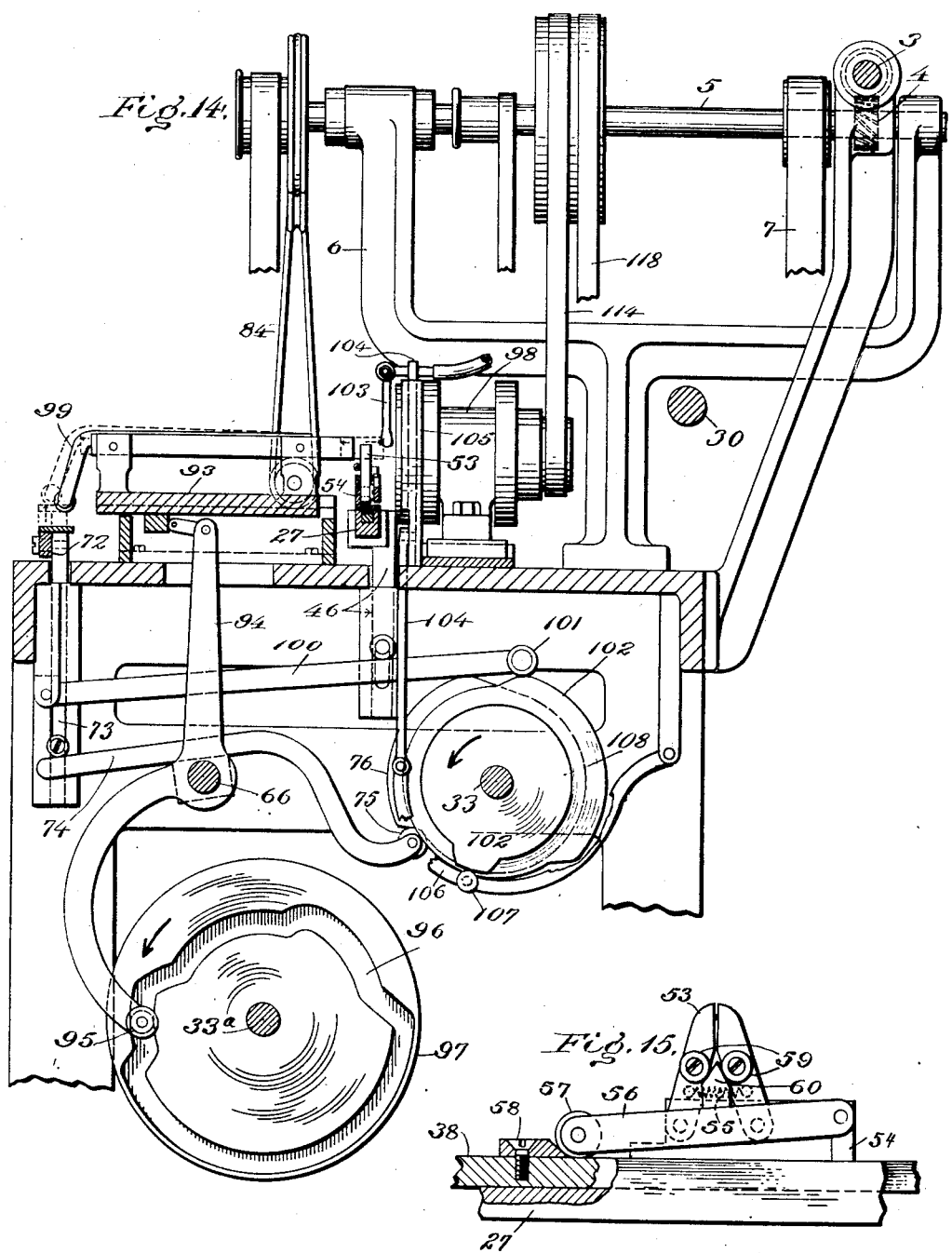
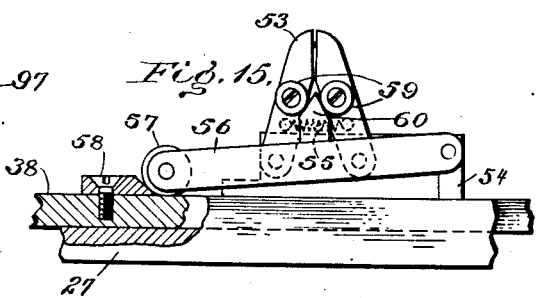

Dec. 25, 1928. 1,696,484
A. HOFMANN ET AL
NEEDLE MAKING MACHINE
Filed Nov. 12, 1927 25 Sheets-Sheet 9
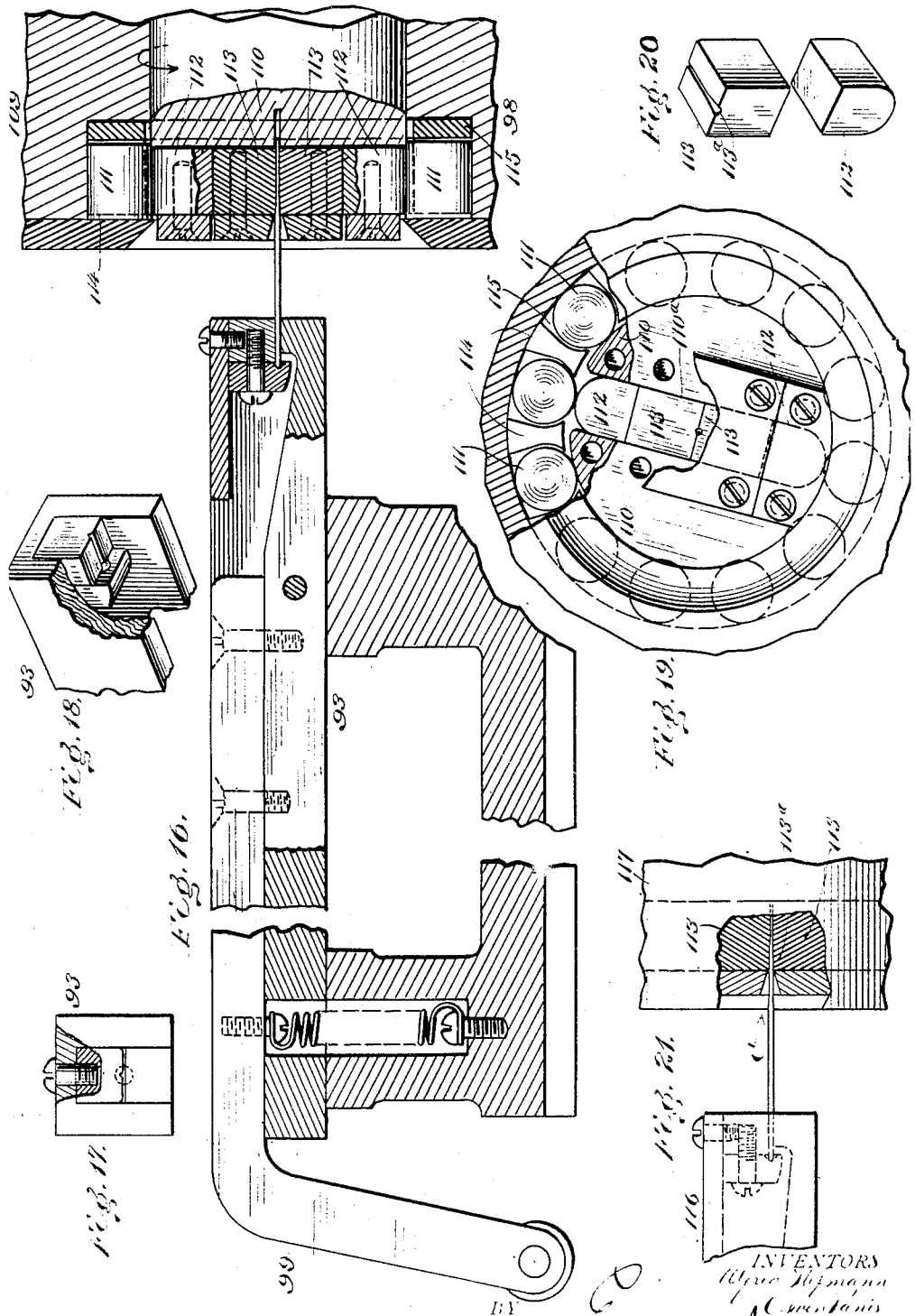

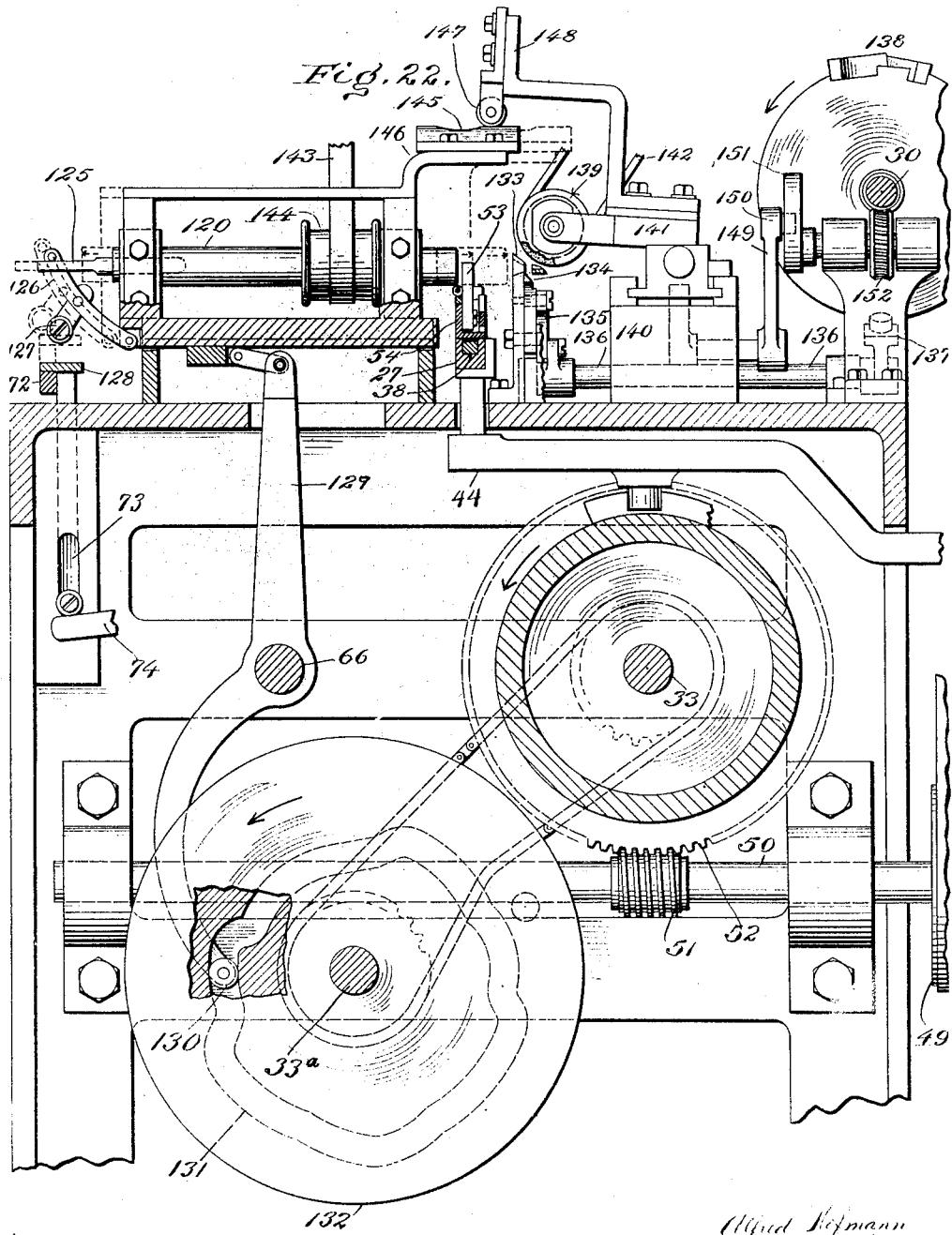

Dec. 25, 1928.
A. HOFMANN ET AL
1,696,484
NEEDLE MAKING MACHINE
Filed Nov. 12, 1927    25 Sheets-Sheet 11
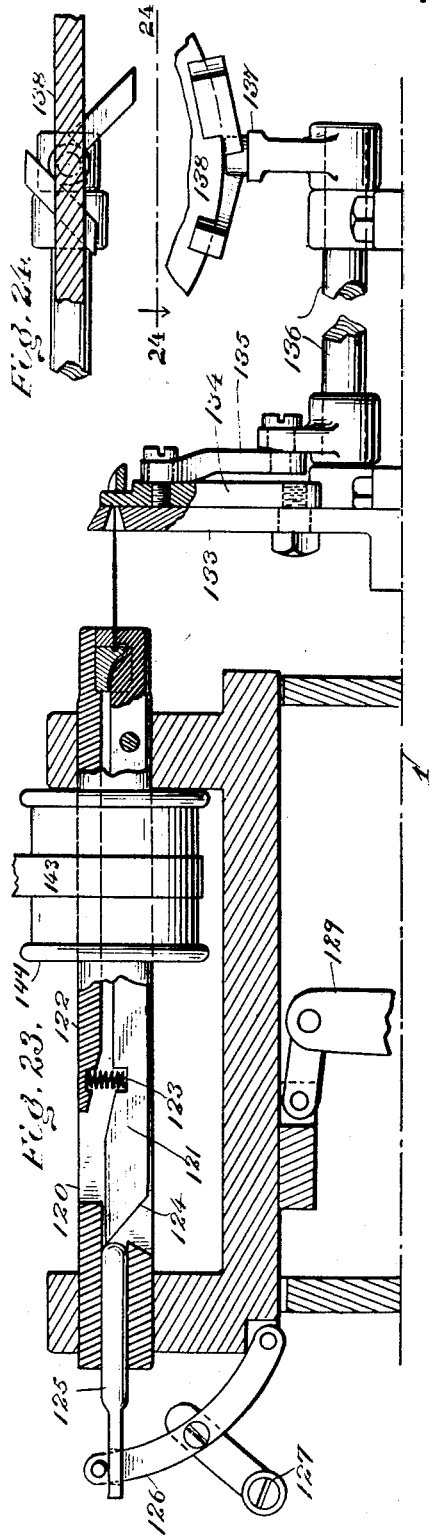
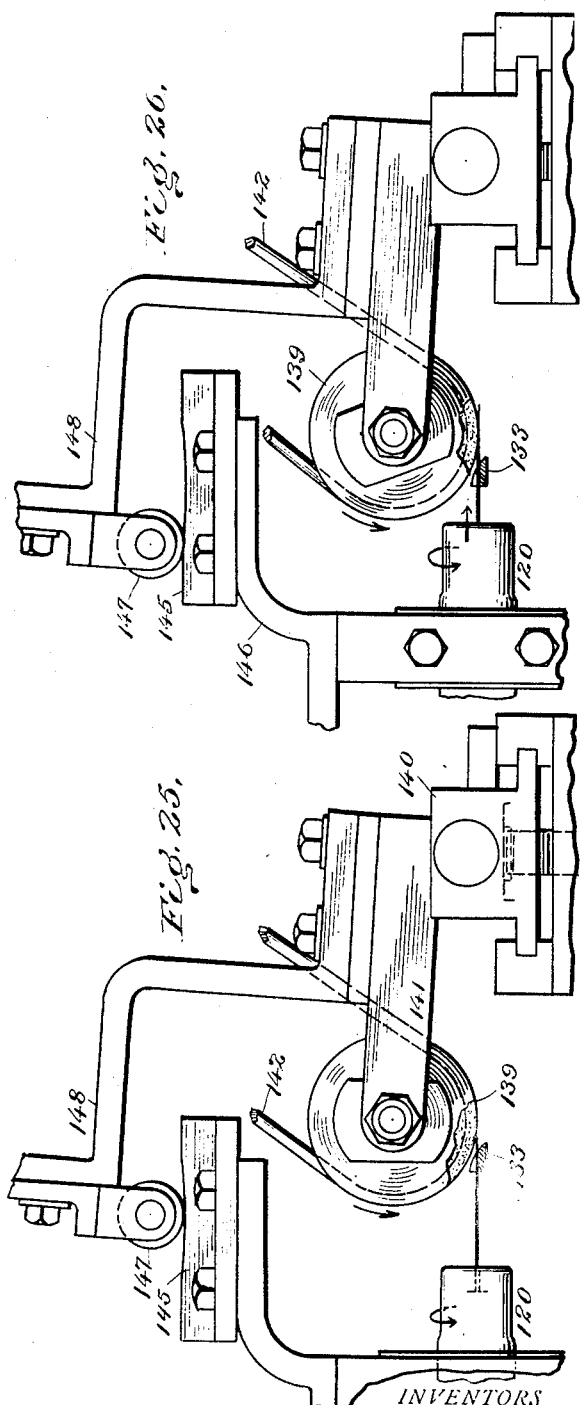
INVENTORS
Alfred Hofmann
Oswin Kanis
BY
ATTORNEY

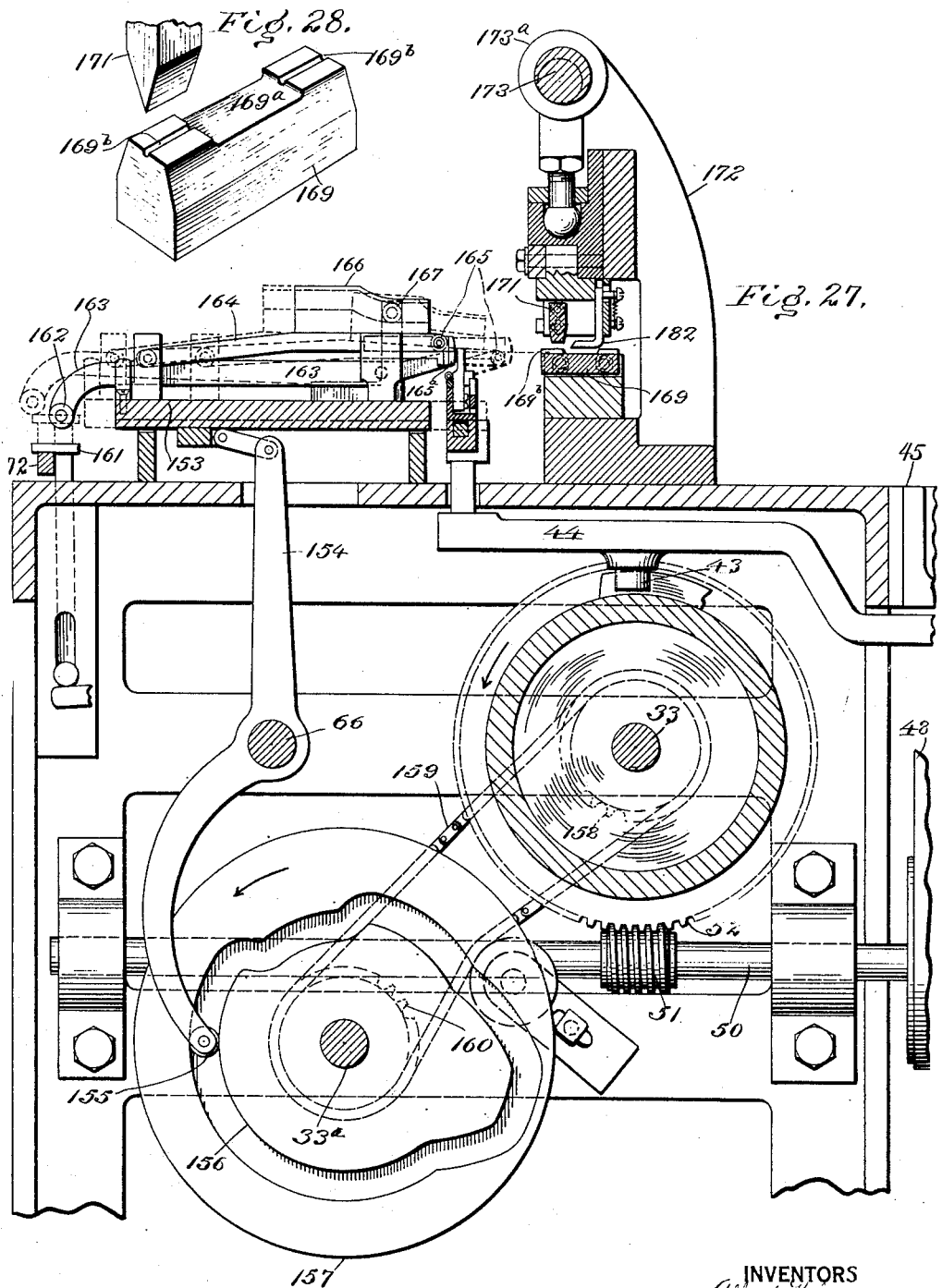

Dec. 25, 1928.
A. HOFMANN ET AL
1,696,484
NEEDLE MAKING MACHINE
Filed Nov. 12, 1927    25 Sheets-Sheet 13
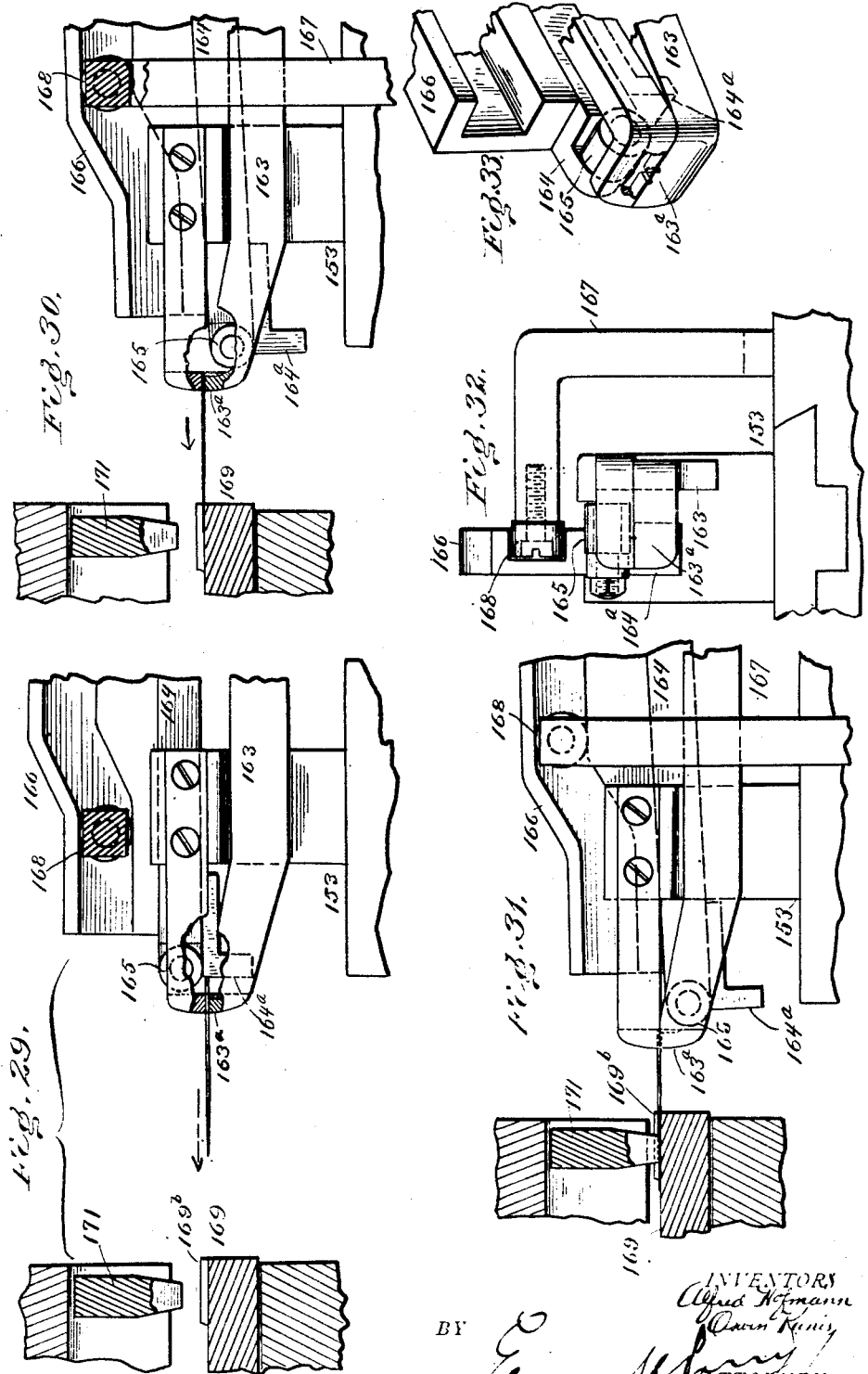

Dec. 25, 1928.  1,696,484
A. HOFMANN ET AL
NEEDLE MAKING MACHINE
Filed Nov. 12, 1927   25 Sheets-Sheet 14
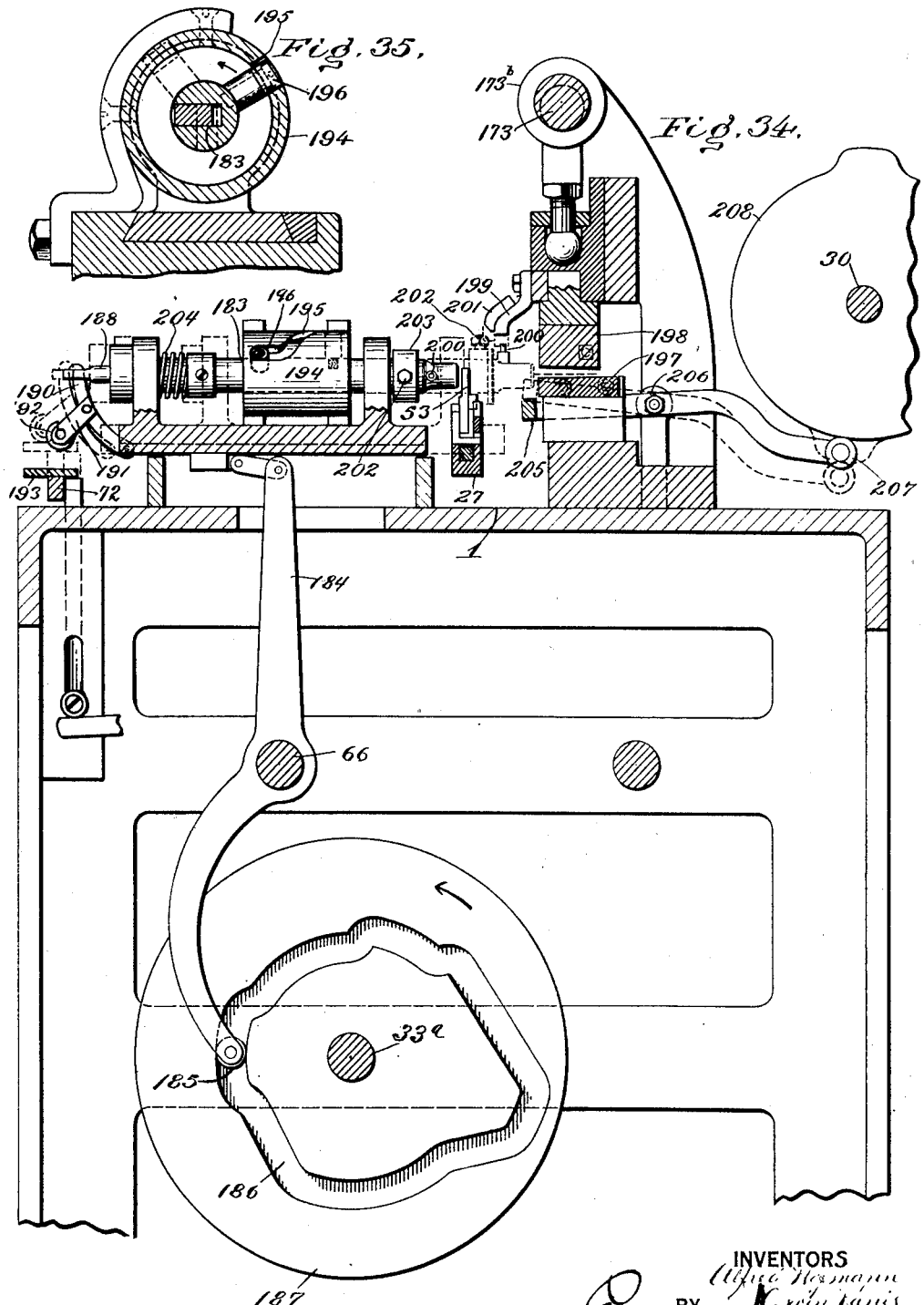

Dec. 25, 1928.
A. HOFMANN ET AL
1,696,484
NEEDLE MAKING MACHINE
Filed Nov. 12, 1927     25 Sheets-Sheet 15
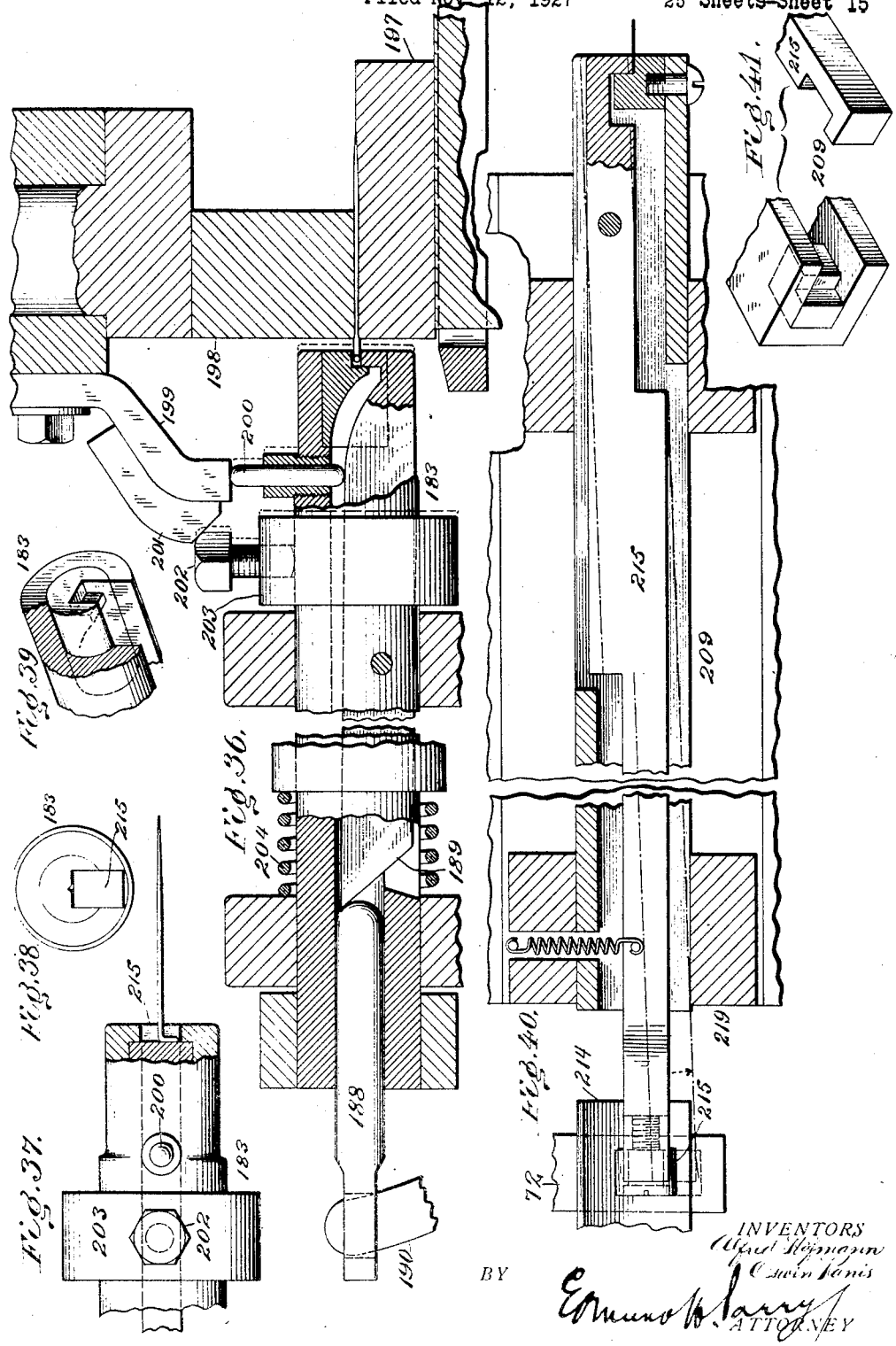
INVENTORS Dec. 25, 1928.
A. HOFMANN ET AL
1,696,484
NEEDLE MAKING MACHINE
Filed Nov. 12, 1927    25 Sheets-Sheet 16
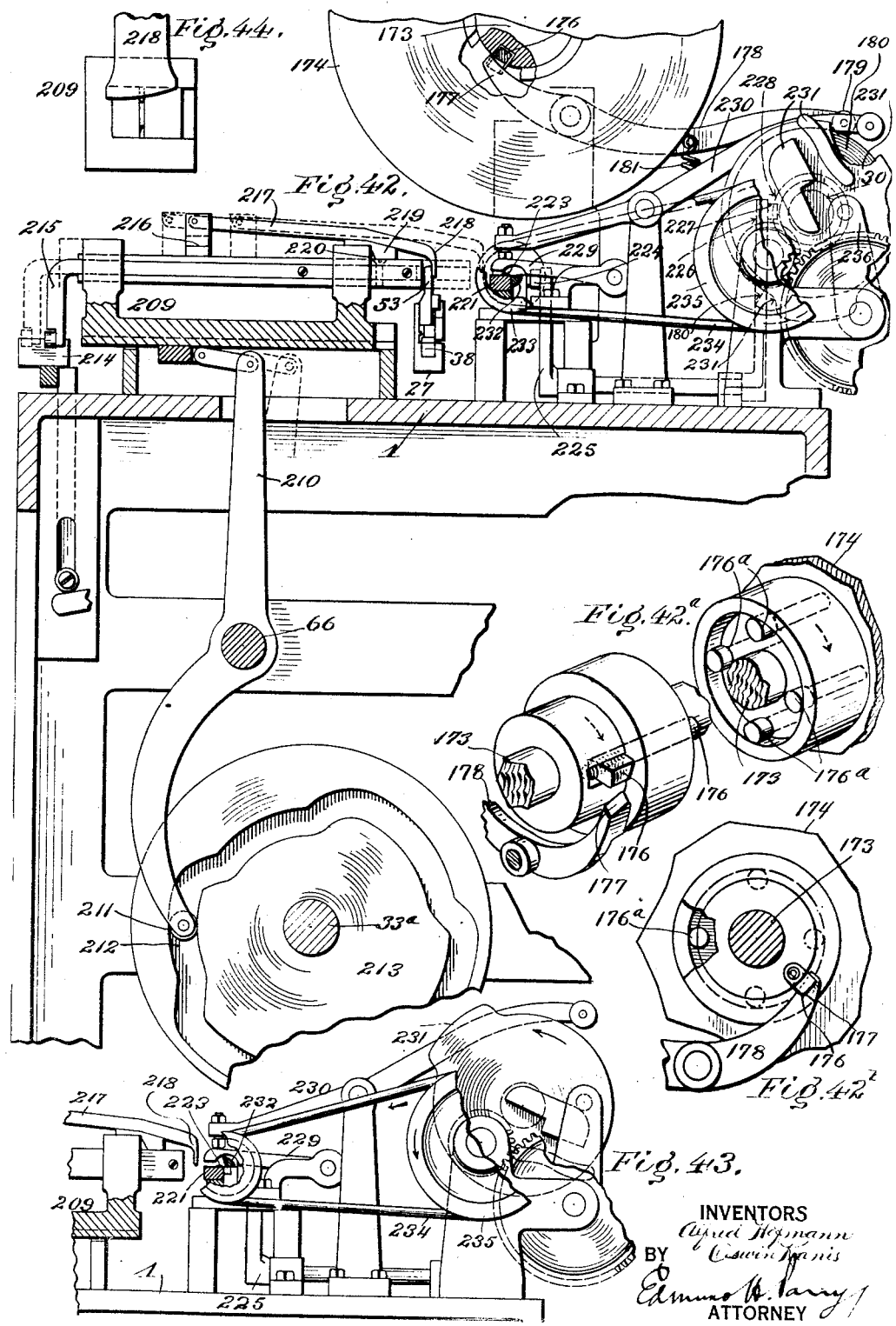
INVENTORS
Alfred Hofmann
Oswin Danis
BY
Edmund␣␣␣
ATTORNEY Dec. 25, 1928.  1,696,484
A. HOFMANN ET AL
NEEDLE MAKING MACHINE
Filed Nov. 12, 1927   25 Sheets-Sheet 17
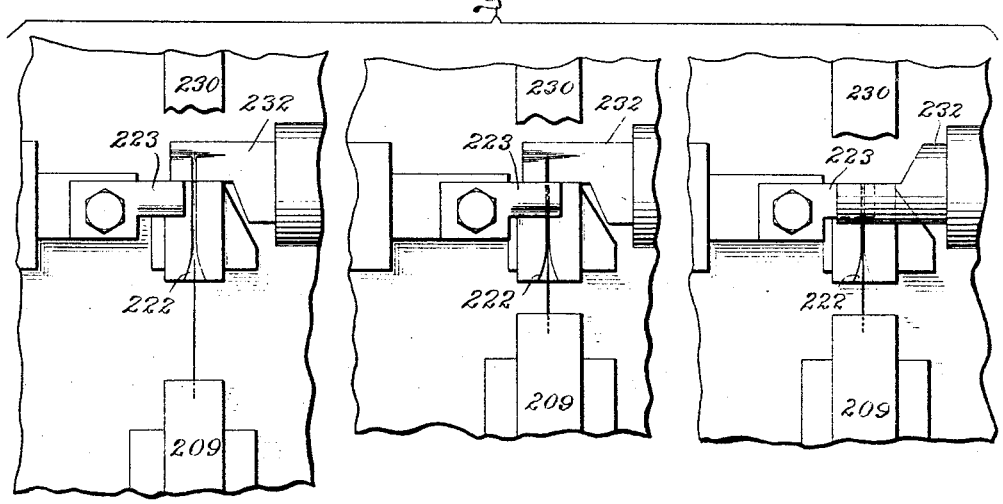
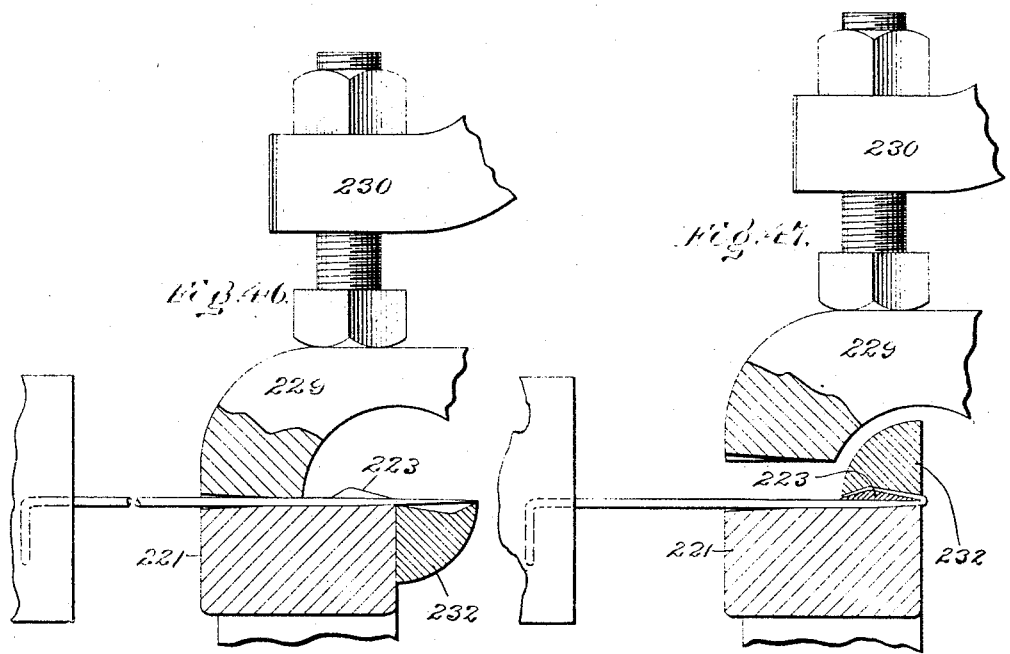
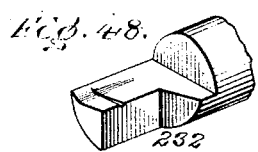
INVENTORS
BY
ATTORNEY Dec. 25, 1928.
A. HOFMANN ET AL
1,696,484
NEEDLE MAKING MACHINE
Filed Nov. 12, 1927
25 Sheets-Sheet 18
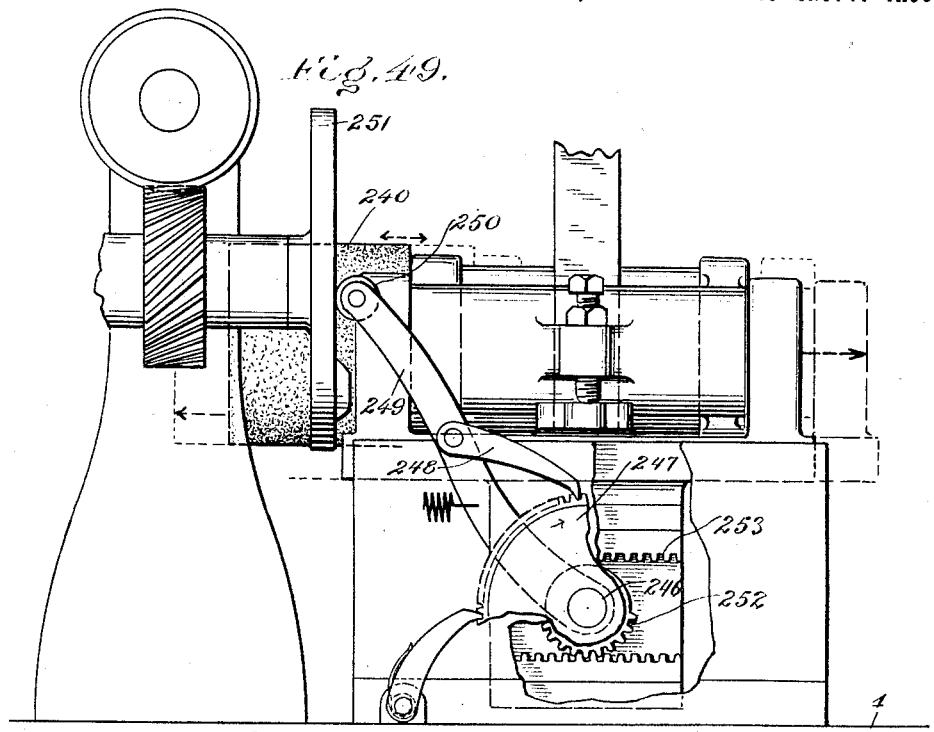
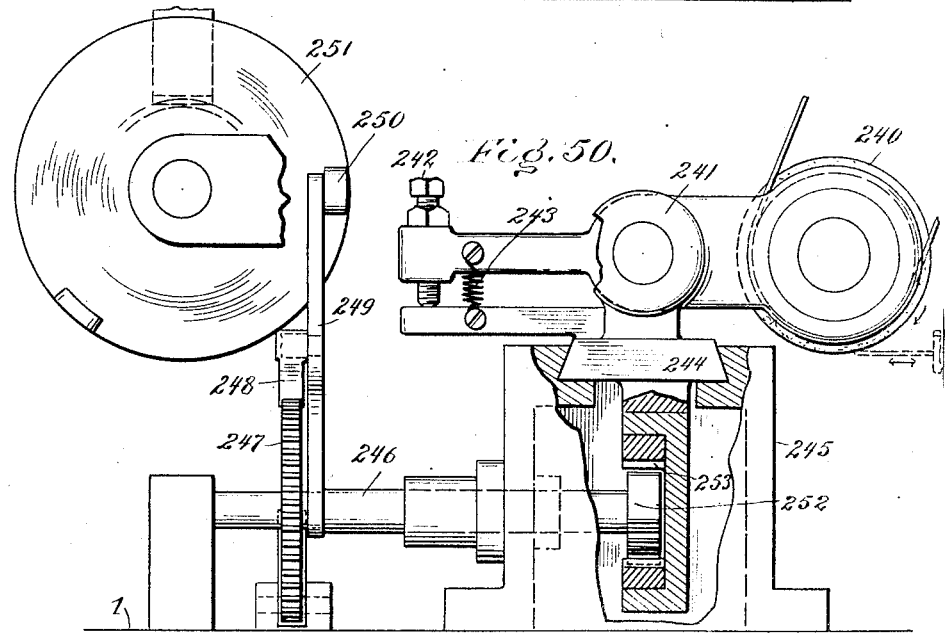
INVENTORS
BY
ATTORNEY

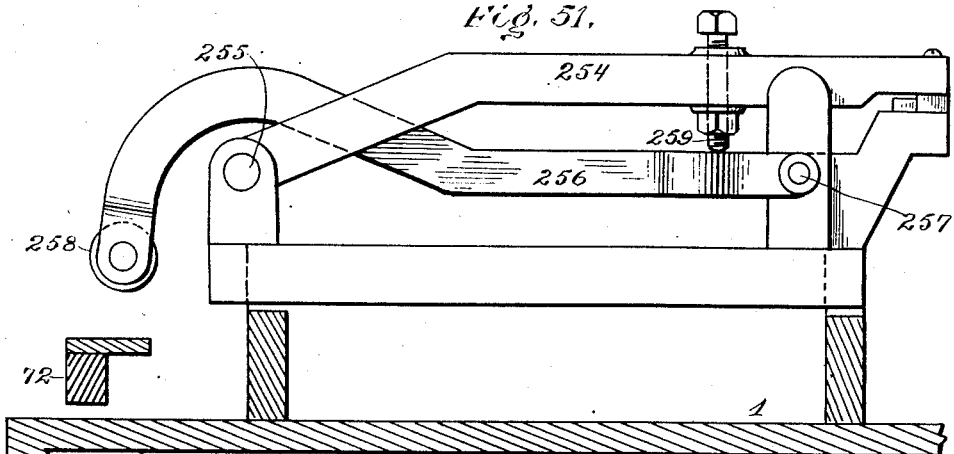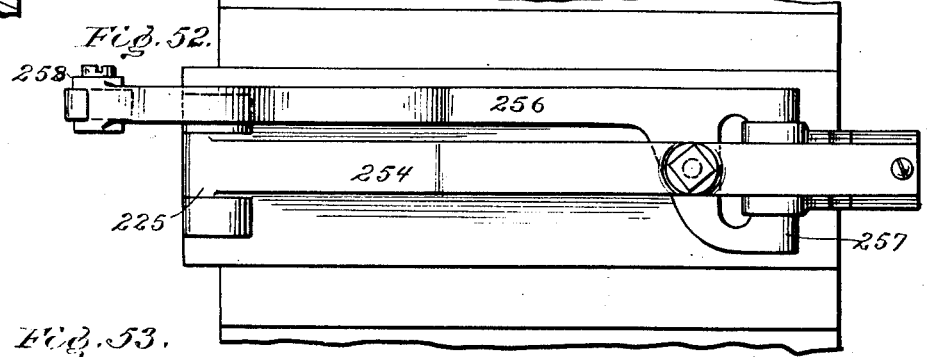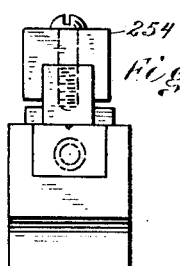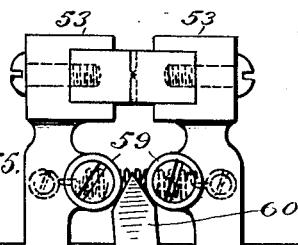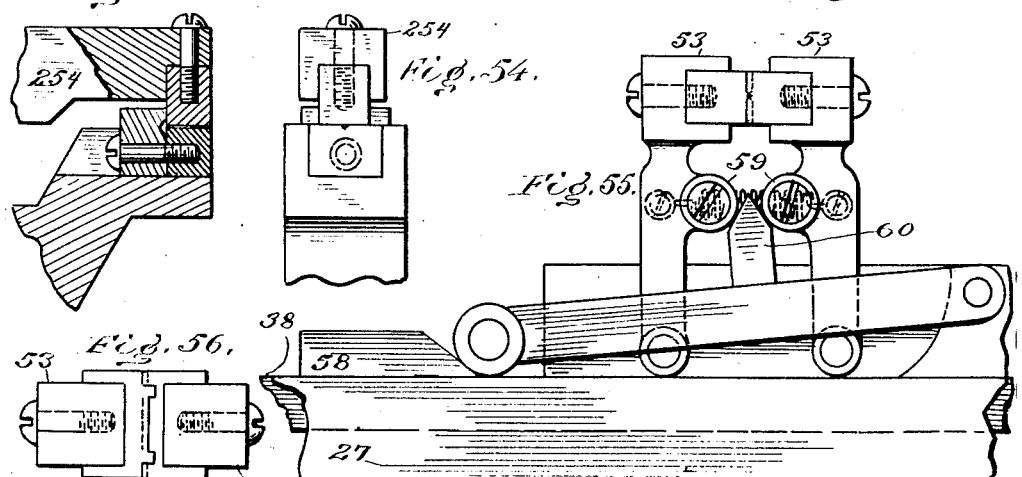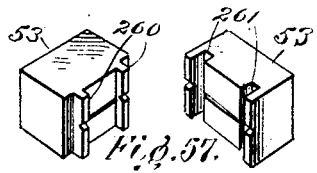

Dec. 25, 1928.   1,696,484
A. HOFMANN ET AL
NEEDLE MAKING MACHINE
Filed Nov. 12, 1927   25 Sheets-Sheet 20
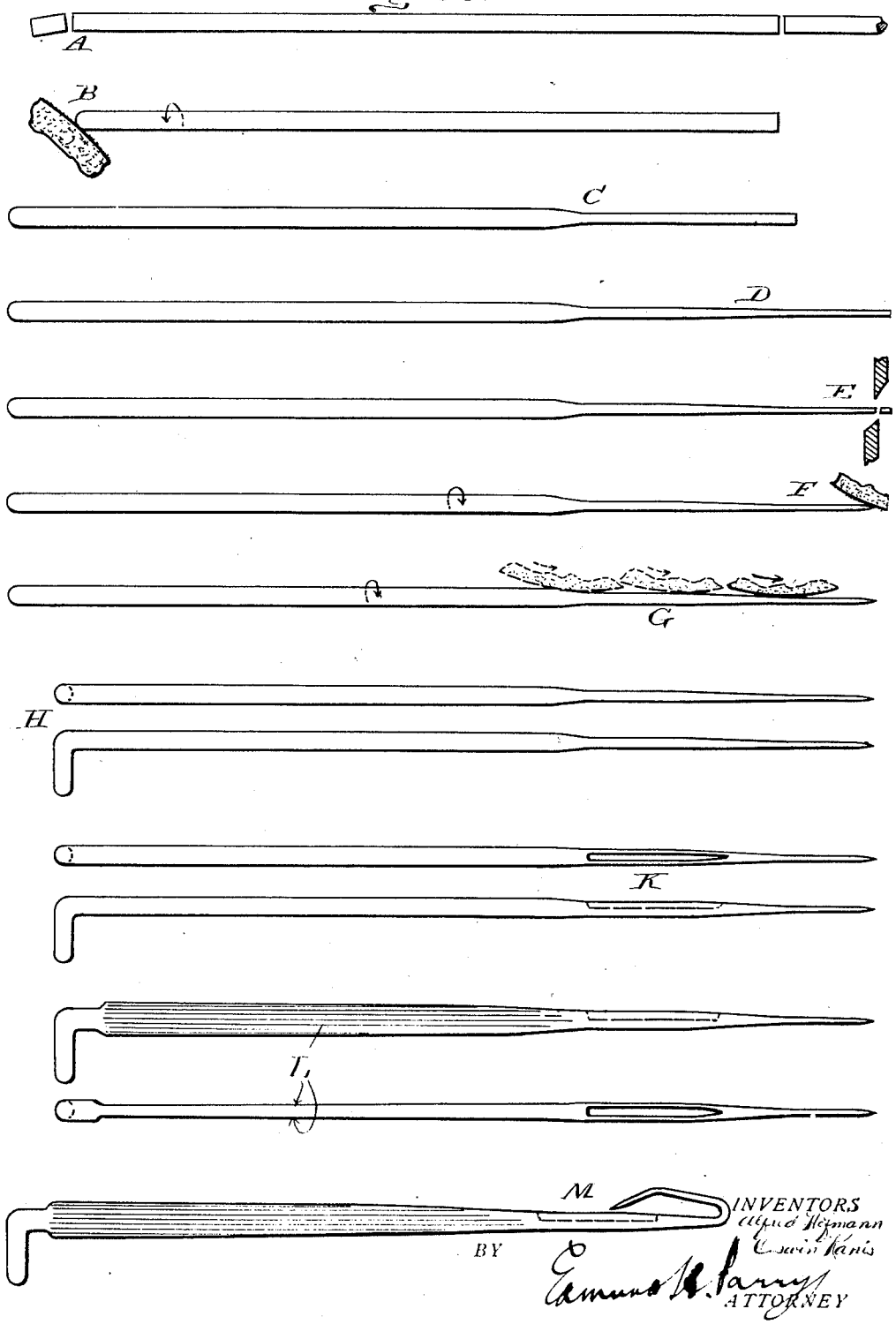

Dec. 25, 1928. 1,696,484
A. HOFMANN ET AL
NEEDLE MAKING MACHINE
Filed Nov. 12, 1927 25 Sheets-Sheet 21

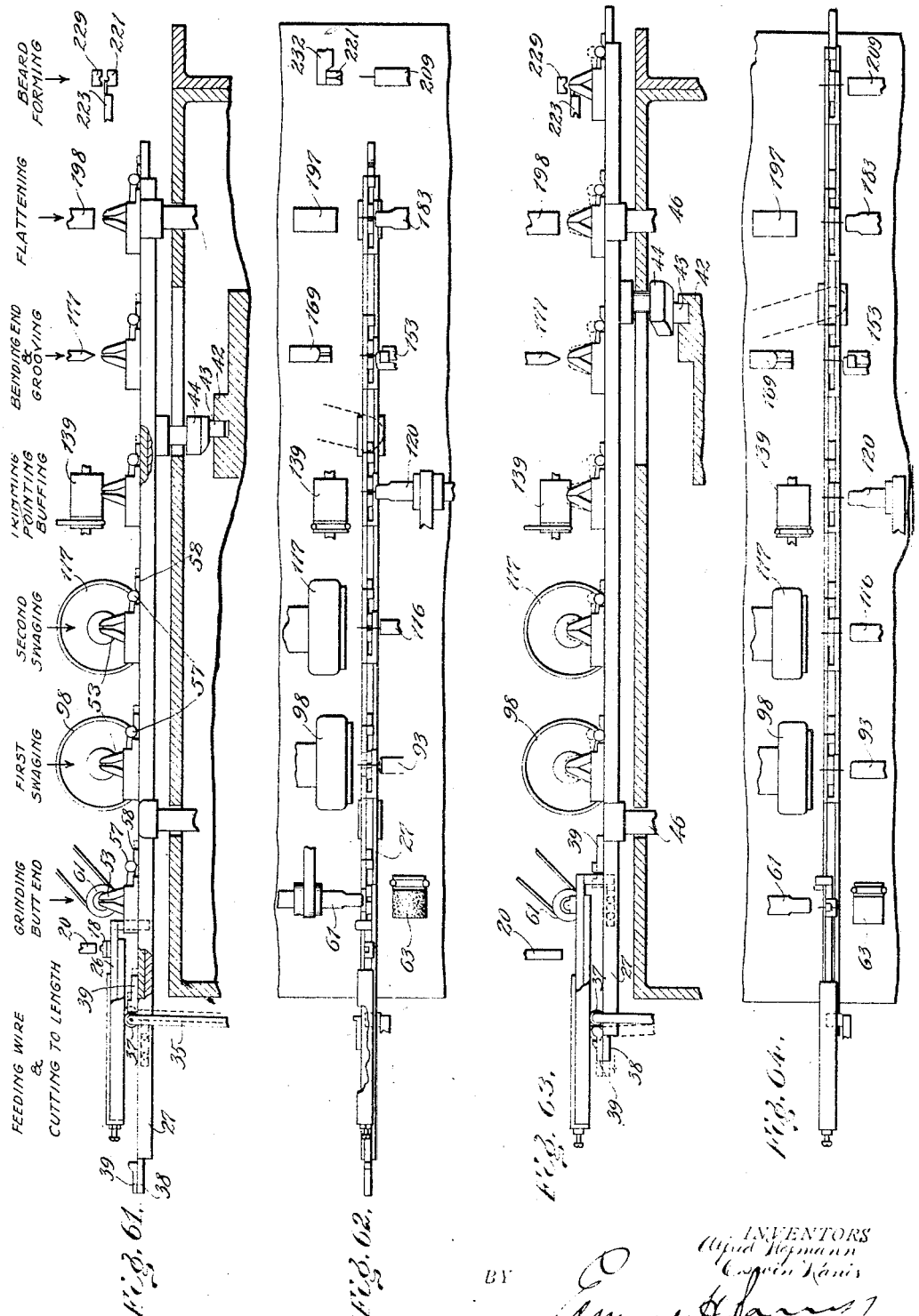

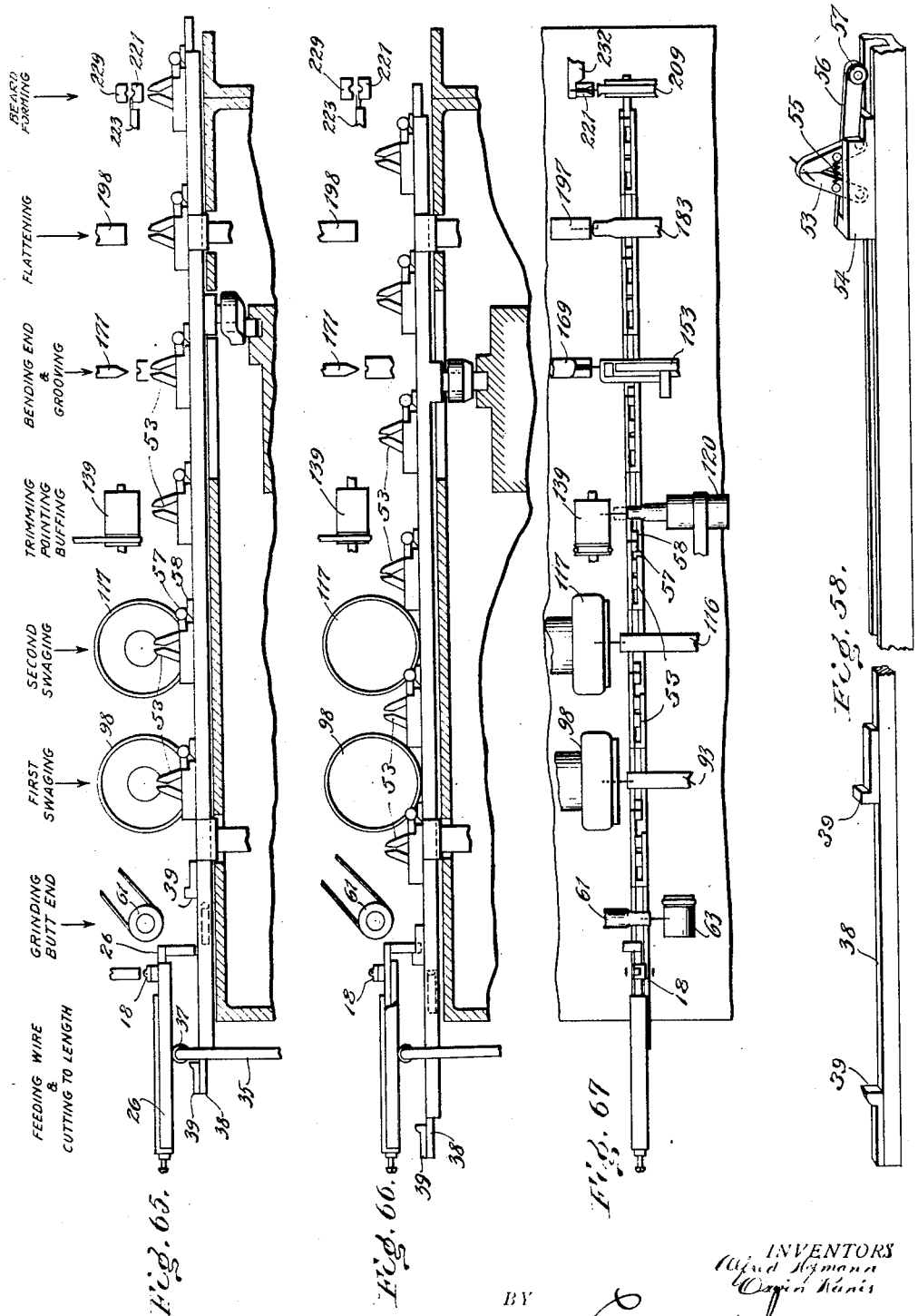

Dec. 25, 1928.
A. HOFMANN ET AL
1,696,484
NEEDLE MAKING MACHINE
Filed Nov. 12, 1927
25 Sheets-Sheet 24
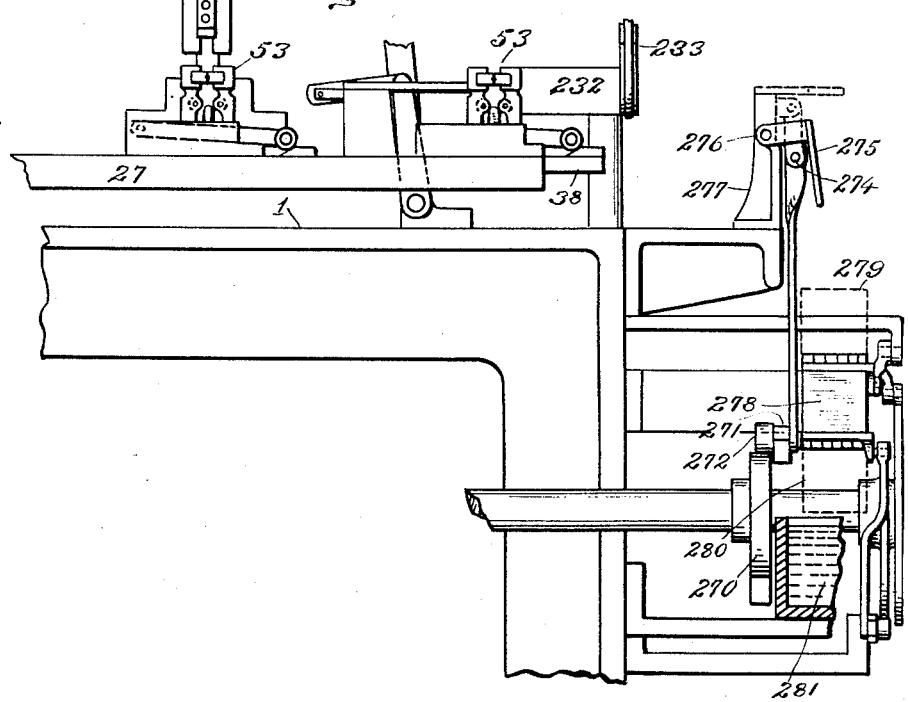
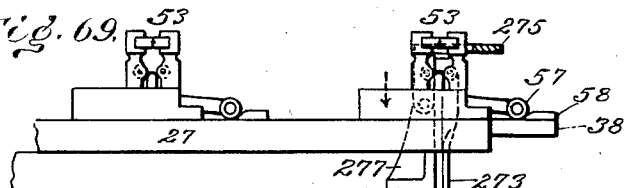
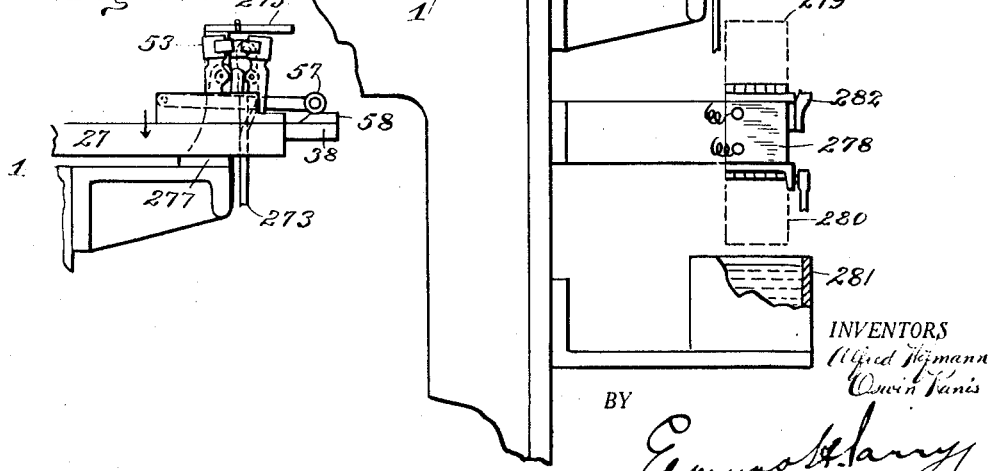

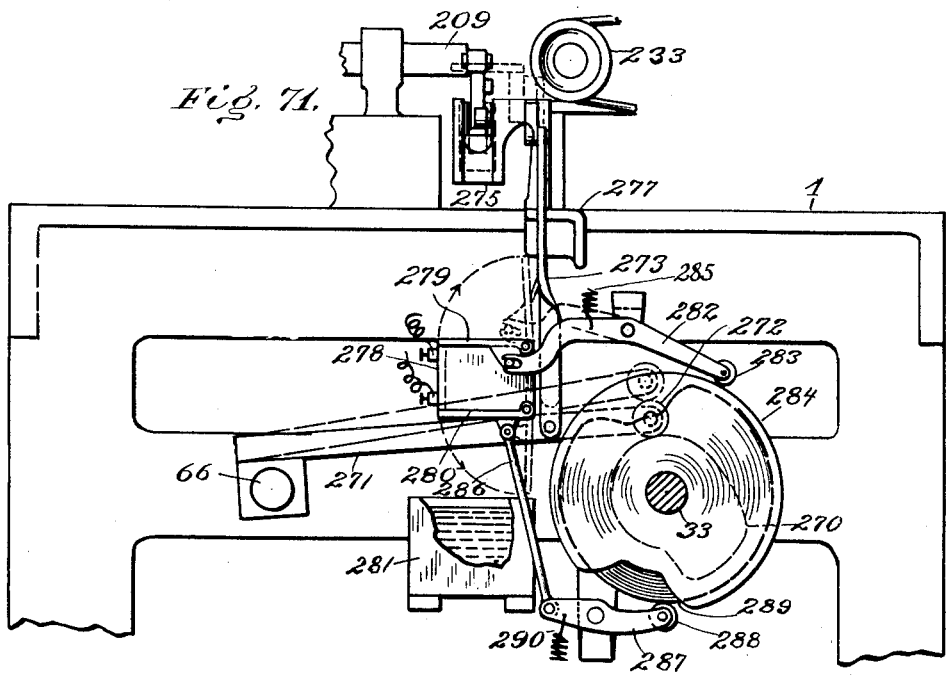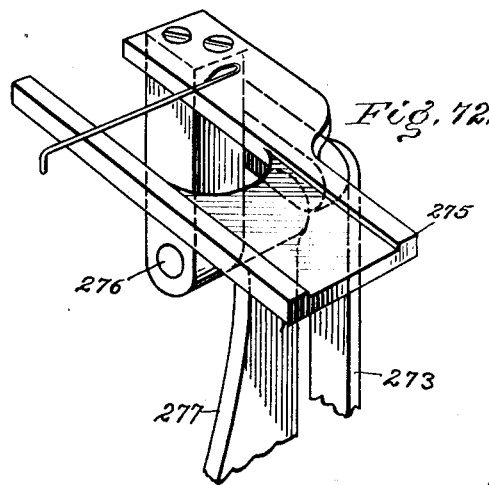

Patented Dec. 25, 1928.

1,696,484

UNITED STATES PATENT OFFICE.

ALFRED HOFMANN, OF FORT LEE, AND OSWIN KANIS, OF UNION CITY, NEW JERSEY, ASSIGNORS TO ALFRED HOFMANN NEEDLE WORKS, INC., OF UNION CITY, NEW JERSEY, A CORPORATION OF NEW JERSEY.

NEEDLE-MAKING MACHINE.

Application filed November 12, 1927. Serial No. 232,794.

This invention relates to needle making machines and, more particularly, to a machine for making spring-beard and similar types of needles used in knitting machines.

It is the primary object of this invention to provide a full-automatic machine, that is, a machine which is entirely automatic in its operation and which will make complete spring-beard needles and needles of similar type from blanks fed to the machine.

Another object is simultaneously to operate upon a plurality of needles in a single machine and successively to discharge therefrom a complete, marketable needle.

A further object within the contemplation of our invention is to provide a machine whereby, by a single continuous procedure, two general operations are performed, namely, a needle-forming operation whereby a spring-beard type of needle—involving swaging, butt-forming, groove-forming, flattening, beard-forming, and other actions—may be produced and, then, a finishing operation, involving tempering; these two general operations being performed in the same machine and successively, one to the other, resulting in the production of a finished product, ready for the market.

A fundamental object of our invention is to produce a machine-made needle, that is, a needle made entirely by machine, without any hand manipulation in the course of its making, between cutting a wire to length to form the needle-blank and the tempering of the formed needle ready for the market.

It is a further object of the invention to provide a machine of this character having a plurality of units or stations, to each of which a needle-blank is successively transferred and at which one or more operations necessary to the completion of a needle may be performed.

A further object is to provide a machine of this character with a carrier moving longitudinally of the machine and which transfers each needle from station to station.

A further object is to provide a carrier having needle-gripping jaws by which a needle is held and maintained in chuck-taking positions during its transfer from one station to another and which accurately present the needle to a work-holder or chuck at each station.

Still another object of the invention is to provide a needle-making machine with a series of work-holders or chucks, each of which is adapted to reciprocate transversely of the machine and in relation to a longitudinally movable carrier and which chuck inserts the needle into an operating instrumentality and withdraws it therefrom upon completion of the operation.

A further object is to provide a needle-making machine having a plurality of needle-carrying members, work-holders, and operating instrumentalities all of which operate simultaneously on a plurality of needles and in synchronism.

A further object is to subject a needle to a series of operations, successively performed, whereby a blank is cut to predetermined length, the butt-end thereof rounded and a butt eventually formed thereon, the beard-end being swaged, trimmed, pointed, buffed, grooved and, eventually, formed with a beard, the needle in the interim being flattened to predetermined dimensions.

A still further object of the invention is to subject the needle, while undergoing certain of the aforementioned operations, to the action of heat whereby any resultant hardness due to such operations may be reduced; the completely formed needle being, finally, subjected to a finishing step, involving heating the same to a predetermined temperature and, then, introducing it into an oil bath, whereby the needle is tempered and made ready for the market.

The invention also contemplates certain subsidiary features, involving the accurate relating to each other of the butt, the grooved noucat, and the beard—as produced in the course of the action of the machine— and likewise the flattened sides. Other subsidiary features include manipulation of the needle at certain stages of its progress through the machine, in such manner that succeeding operations performed thereon may be accomplished with precision and with production of a series of needles of uniform character.

Other objects and advantages of the invention will in part be obvious and in part be more fully brought out as the description proceeds.

Our inventive-concept involves not only structure for making and finishing a needle ready for the market as aforementioned, but, also, a method with which said structure may advantageously be utilized.

In the accompanying drawings, we have illustrated one of several possible and practical embodiments of our invention; but it is to be understood that the drawings are illustrative merely and are, in no way, to be considered as limiting the invention to the details therein shown. Many modifications and variations may be made by those skilled in the art without departing from the spirit or underlying principles and salient features of our invention.

In these drawings:

Fig. 2 is a plan view of the left half of the machine;

Fig. 3 is a plan view of the right half of the machine;

Fig. 4 is a plan view on an enlarged scale of the wire-holder in the cutting mechanism;

Fig. 5 is a sectional view taken on line 5—5 of Fig. 2;

Fig. 6 is a longitudinal section of the left half of the machine taken along the lines of the main transfer bar or carrier;

Fig. 7 is a longitudinal section of the right half of the machine taken along the same line as in Fig. 6;

Fig. 8 is a sectional view of the wire-cutting mechanism taken on line 8—8 of Fig. 1;

Fig. 9 is a fragmentary perspective view of the initial-transfer mechanism;

Fig. 10 is a sectional view taken on line 10—10 of Fig. 1 and showing the butt-grinding mechanism;

Fig. 11 is a detached fragmentary view of the timing and actuating mechanism for the chuck which holds the needle in the butt-grinding operation;

Fig. 12 is a detached view, on a larger scale, showing the jaws of the chuck closed and the needle in contact with the grinding-wheel;

Fig. 13 illustrates the contact of the needle with the grinding-wheel;

Fig. 14 is a sectional view of the mechanism for the first swaging taken on line 14—14 of Fig. 1;

Fig. 15 is an enlarged view of the needle-carrying jaws;

Fig. 16 is a view, partly in elevation and partly in section, showing the chuck and swaging mechanism of the first swaging operation;

Fig. 17 is a front view of the jaws of the chuck illustrated in Fig. 16;

Fig. 18 is a broken perspective view of one of the jaws of the chuck;

Fig. 19 is a front view of the swaging mechanism, certain parts being broken away;

Fig. 20 illustrates the swaging-blocks of the swaging mechanism;

Fig. 21 is a fragmentary view of the mechanism in position for the second swaging operation;

Fig. 22 is a sectional view taken on line 22—22 of Fig. 1 and illustrates the mechanism for trimming-to-length, pointing and buffing;

Fig. 23 is an enlarged, broken, sectional view of the chuck and trimming mechanism, taken on the same line as Fig. 22;

Fig. 24 is a sectional view on line 24—24 of Fig. 23, and illustrates the cam for operating the trimming-knife;

Fig. 25 is a detail of the mechanism utilized in the pointing operation;

Fig. 26 is a detail of the mechanism utilized in the buffing operation;

Fig. 27 is a sectional view taken on line 27—27 of Fig. 1, and illustrates the mechanism for turning down the butt-end of the needle and punching the groove or noucat which ultimately underlies the spring-beard;

Fig. 28 is a fragmentary perspective view of the groove punch and die;

Fig. 29 is an enlarged sectional view on line 27—27 of Fig. 1 showing the needle gripped by the chuck prior to bending the butt-end;

Fig. 30 is a view similar to Fig. 29 showing the butt-end rolled down to form the butt;

Fig. 31 illustrates the step of punching the groove or noucat, following the step illustrated in Fig. 30;

Fig. 32 is a front view of the chuck used in these operations;

Fig. 33 is a fragmentary perspective view of the chuck, illustrating the mechanism for rolling down the butt-end;

Fig. 34 is a section taken on line 34—34 of Fig. 1, and illustrates the mechanism for flattening the needle;

Fig. 35 is a sectional view of the chuck illustrated in Fig. 34;

Fig. 36 is an enlarged sectional view of the chuck and hammer in position to flatten the needle, the chuck being shown, in full lines, in the position it assumes when slightly retracted from its fully advanced position, indicated in dotted lines;

Fig. 37 is a detail, partly in section, of the chuck holding the needle while it is being flattened;

Fig. 38 is a front view of the chuck;

Fig. 39 is a fragmentary perspective view of one of the jaws of the chuck;

Fig. 40 is a fragmentary sectional view of the chuck for holding the needle in the step of forming the beard;

Fig. 41 is a collective view, in detail, of the gripping-jaws of the chuck illustrated in Fig. 40, showing the jaws separated;

Fig. 42 is a sectional view taken on line 42—42 of Fig. 1, and illustrates the beard-forming mechanism;

Figure 60:
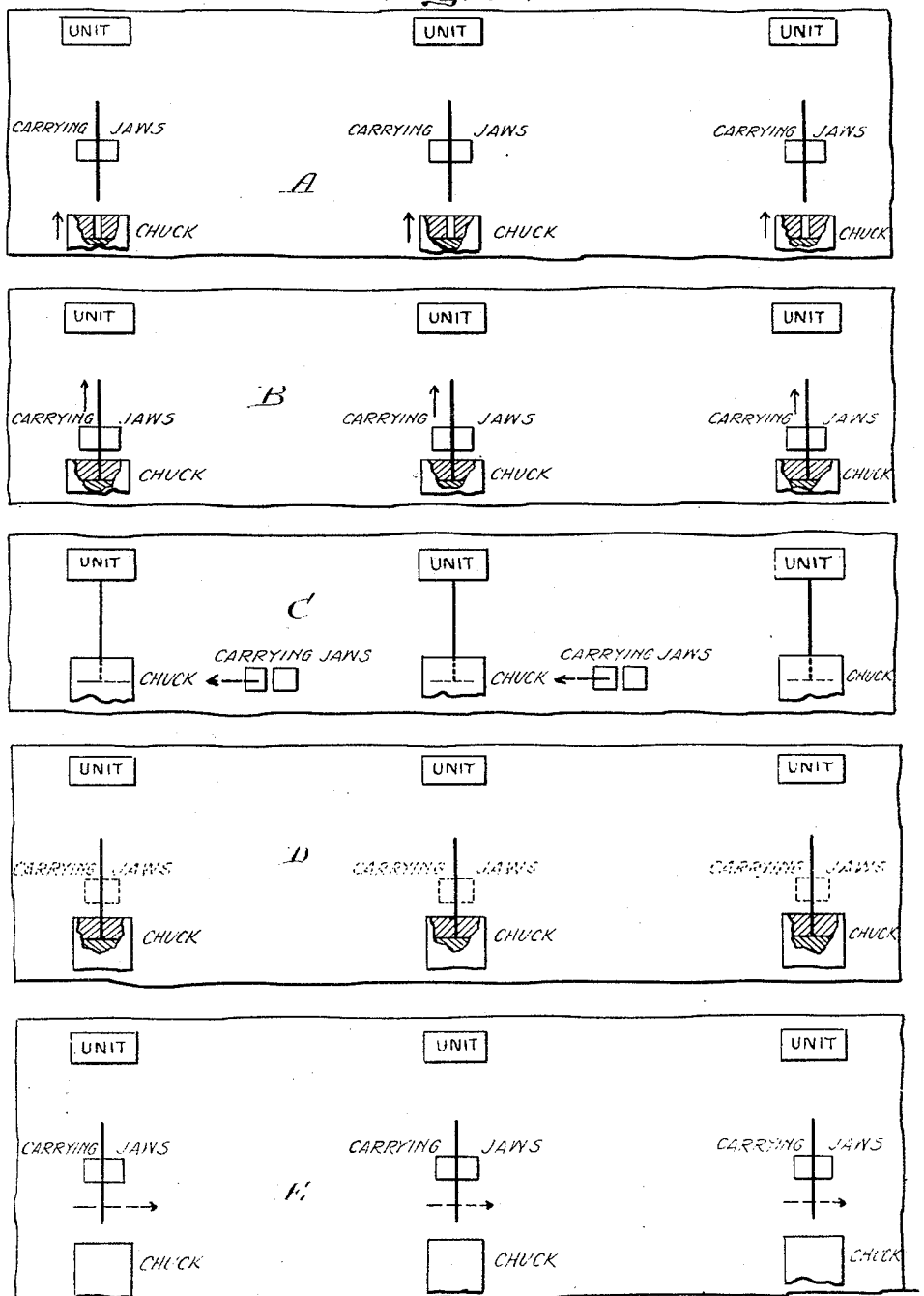

Figs. 42ª and 42ᵇ are fragmentary views in sectional perspective and section, respectively, of the fly-wheel and the means for clutching it to its drive;

Fig. 43 is a view similar to Fig. 42, showing the mechanism thereof in an advanced position;

Fig. 44 is a fragmentary, front view of the chuck illustrated in Fig. 40;

Fig. 45 is a plan view showing three successive steps in the beard-forming operation;

Fig. 46 is an enlarged detail view, partly in section, of the beard-forming mechanism in the position it occupies just prior to the formation of the beard;

Fig. 47 is a view similar to Fig. 46 and showing the beard completed;

Fig. 48 is a fragmentary perspective view of the active end of the beard-forming member;

Fig. 49 is a fragmentary view, in sectional elevation, of a modification of the adjusting mechanism for the butt-grinding wheel;

Fig. 50 is a side elevation of the mechanism illustrated in Fig. 49;

Fig. 51 is a view in side elevation of a modified form of chuck for holding the needle in the swaging operation;

Fig. 52 is a plan view of the chuck illustrated in Fig. 51;

Fig. 53 is a fragmentary sectional view of the jaws of the chuck illustrated in Fig. 51;

Fig. 54 is an end view of the jaws of the chuck;

Fig. 55 is a view in front elevation of a modified form of needle-carrying jaws;

Fig. 56 is a top plan view of the needle-carrying jaws;

Fig. 57 is a collective view, in perspective, of the needle-carrying jaws, separated;

Fig. 58 is a perspective view of a portion of the needle-carrier and needle-gripping jaws;

Fig. 59 is a series of views of the needle showing, diagrammatically, the results of the various operations performed upon it;

Fig. 60 is a series of diagrammatic views showing compensating means employed in conjunction with the several chucks, and operating during the needle transfer;

Fig. 61 is a diagrammatic view indicating, by legends, the various stations to which the needle-blank is successively transferred and also showing the carrier in elevated position with each set of the carrying-jaws open and ready to take its respective needle-blank;

Fig. 62 is a plan view of Fig. 61;

Fig. 63 is a diagrammatic view similar to Fig. 61 but showing the carrier shifted to the right, and the carrying-jaws of each set about to open to release its respective needle-blank;

Fig. 64 is a plan view of Fig. 63;

Fig. 65 is a diagrammatic view similar to Fig. 63 but showing the mechanism in the position it occupies when the sets of carrying-jaws have opened and the carrier has descended to its lower position;

Fig. 66 is a diagrammatic view similar to Fig. 65 but showing the carrier shifted to the left, with the carrying-jaws open and in a stationary or "idle" position between the various operating stations;

Fig. 67 is a plan view of Fig. 66;

Fig. 68 is a fragmentary, front view of the take-off device and of the tempering mechanism employed in the needle-finishing operation;

Fig. 69 is a front view showing the take-off device in position to receive a needle from the carrying-jaws;

Fig. 70 is a fragmentary front view showing the carrying-jaws opening and the main carrrier descending;

Fig. 71 is an end elevation of the take-off device and tempering mechanism; and

Fig. 72 is a perspective view of the take-off device.

General Outline.

It has already been pointed out that the needle-blank is advanced successively to a series of units or stations at which one or more operations on the blank are performed. In addition to a "Supporting and Driving Structure", these units or stations, preferably and as shown, include:

Wire-straightening mechanism;
Cutting-to-length mechanism;
Initial transfer mechanism;
Main transfer mechanism;
Butt-grinding mechanism;
First swaging mechanism;
Second swaging mechanism;
Trimming, pointing and buffing mechanism;
Butt-forming and groove-punching mechanism;
Needle-flattening mechanism;
Beard-forming mechanism; and
Removing and tempering mechansim.

These stations are respectively indicated by appropriate legends in Figs. 61 and 65.

The first of these operations is to cut a predetermined length from the wire fed to the machine, as illustrated at A in Fig. 59. It will be observed that the wire is cut in two places, thus leaving a short piece at one end which is discarded. This assures uniform length of all of the blanks. The blank is then transferred to the butt-grinding mechanism and is thereby rounded off (as indicated at B, Fig. 59) to insure accurate fitting of the completed needle in the butt-hole of the needle-bar of the knitting machine. The needle then proceeds to the first swage where the point-end is reduced in diameter for accurately dimensioning that portion of the needle for the subsequent operation of groove-forming, and it is also thereby somewhat elongated, as shown at C, Fig. 59. The needle is then carried to a second swage and further acted upon, as shown at D, for accurate dimensioning of the beard-portion of the needle. The needle will have been materially elongated by the swaging operations; hence, the first operation at the next station is to trim it to the length of the ultimate product (see E, Fig. 59). At this station, the operations of pointing and buffing are also performed, as indicated at F and G, respectively, the buffing being for the purpose of cleaning and smoothing the needle. At the next station, two operations are performed; that is, the hook, butt, or bent end is rolled down, as at H, and the groove or noucat is punched, as at K. The needle then proceeds to the next station where it is flattened, as at L, thus forming it to fit in grooves or slots in the needle-bar of the knitting-machine and, also, eliminating any bulging at the sides which may have been effected during the grooving operation, insuring precise dimensioning of the ultimate product. The flattened needle then goes to the beard-forming mechanism where the beard is formed, as indicated at M. This completes the series of operations for forming the needle, and it then is practically completed, requiring only tempering. In the machine, as herein disclosed, we have included in it mechanism and means for performing this final operation, of tempering, so that as thus constituted the machine is constructed and organized for the aforementioned two general procedures, namely, forming and finishing the needle, performed as continuous operations, and whereby a needle is produced, complete and ready for the market except, perhaps, for inspection.

*Supporting and driving structure.*

The machine has a base or bed plate 1 on which brackets 2, 2, are mounted. These brackets support a main drive-shaft 3 which is provided with a gear 4 meshing with a similar gear on a shaft 5 journaled in a bracket 6.

The main drive-shaft 3 also operates a cam-shaft 33 through a belt 48 which drives a pulley 49 on a shaft 50 having a worm 51 meshing with a gear 52 on the cam-shaft.

The cam-shaft 33 drives a shaft 30 by means of a sprocket-chain 31 which is trained about a sprocket 29 on the shaft 30 and a sprocket 32 on the cam-shaft 33 (Fig. 8).

The cam-shaft 33 also drives another cam-shaft 33$^a$, this being effected through a sprocket-chain 159 which is trained about a sprocket 158 on the cam-shaft 33 and a sprocket 160 on the cam-shaft 33$^a$. In Fig. 27, the means (hereinafter described) for operating the cam-shafts 33 and 33$^a$ in unison are shown.

The foregoing is the general driving mechanism of the machine and includes the drive for the various stations, for the needle-carrier which operates in conjunction therewith, and for the preliminary step of straightening the wire prior to its introduction to the first station.

*Wire-straightening mechanism.*

A pulley on the shaft 5 is connected by a belt 7 to a wire-straightener 8 which is provided with grooved interdigitating rollers 9. The straightener is rotatably journaled in bearings 10 mounted on the bed-plate. The wire $w$ is supplied to the straightener from a reel or other device (not shown), and passes, first, through a cleaner 11 mounted on the bed-plate. The purpose of the cleaner is to scrape off any oil, dust or dirt which may have accumulated on the wire and to thus present it in clean condition for the subsequent operations performed on it in the machine. The wire is then threaded through the rollers 9 and passed through an aperture in a bracket 12 to be received by a conveyor 13 slidably mounted on a support 14. The conveyor 13 is operated by a lever 15 which is actuated by a mechanism to be hereinafter more fully described.

*Cutting-to-length mechanism.*

The wire having been threaded through the straightener 8 and inserted in the conveyor 13, the machine is set in motion. The shaft 22 is driven by shaft 30 through the gear 28. The shaft 30 is driven by a sprocket-chain 31 trained about a sprocket 32 on the cam-shaft 33. At its front end, the shaft 22 is provided with a gear 23 which drives a short shaft 40 on which is mounted a disk 24. This disk is provided with a groove 25 in which one end of the lever 15 is adjustably secured, thus effecting an adjustable eccentric mounting for the lever. As the disk 24 rotates, the lever 15 will draw the conveyor 13 forward and the wire will be inserted into a tube 17 secured in one of a pair of brackets 16 mounted on the bed-plate. The wire is then introduced into an apertured blank-holder 18 provided with a spring-finger 18$^a$. Adjustably mounted on the brackets 16 are the lower fixed knives 19 and upper movable knives 20, the latter being held in elevated position by means of springs (not shown). When the wire is in position to be cut, the knives 20 are depressed by cams 21 on the shaft 22. It will be understood that the pairs of knives are spaced apart a distance equal to the length of the blank and that the wire is, therefore, simultaneously cut in two places, as indicated at A in Fig. 59. A short piece of the wire is discarded, but by this arrangement of the knives, uniformity in the length of the blanks is assured.

*Initial transfer mechanism.*

The wire having been cut, the initial transfer mechanism now becomes operative to transfer the blank to the first of the series of chucks, that is, the chuck which holds the blank during the butt-grinding operation.

The initial transfer mechanism is best illustrated in the perspective view in Fig. 9. It will be noted that the apertured block 18 which holds the wire during the cutting operation is mounted upon a slidable bar 26 provided with a retracting spring 26ᵃ. The sliding bar 26 is supported in a channel suitably mounted immediately above and in direct vertical alinement with a carrier 27 of the main transfer mechanism (presently to be described). The carrier 27 is provided with an adjustable lug 40 which, upon movement of the carrier to the right, as viewed in Fig. 1, engages a depending arm 41 on the sliding bar 26 and, thus, carries the latter to the right, thereby transferring the needle to a chuck which will receive and hold it during the butt-grinding operation, hereafter described. The sliding bar 26 is returned to its initial position by the action of the spring 26ᵃ. The return movement occurs when the carrier 27 has dropped to its lower position, thus breaking the contact of the lug 40 with the arm 41.

*Main transfer mechanism.*

In order to transfer the needle from station to station and, thus, to a series of chucks juxtaposed to the several stations, we have provided the aforementioned carrier 27 on which a series of equidistantly spaced sets of needle-carrying-jaws 53 are mounted. Motion is transmitted to the carrier from a drum-cam 42 mounted on the cam-shaft 33. Cooperating with this cam is a follower 43 connected to a lever 44 which is pivoted at one end to a bracket 45 mounted on the bed-plate and connected at its other end to the carrier (Figs. 3 and 27). The cam is so formed that upon rotation it will oscillate the lever 44 and, thus, reciprocate the carrier 27 in a horizontal plane, longitudinally of the machine.

Figure 1:
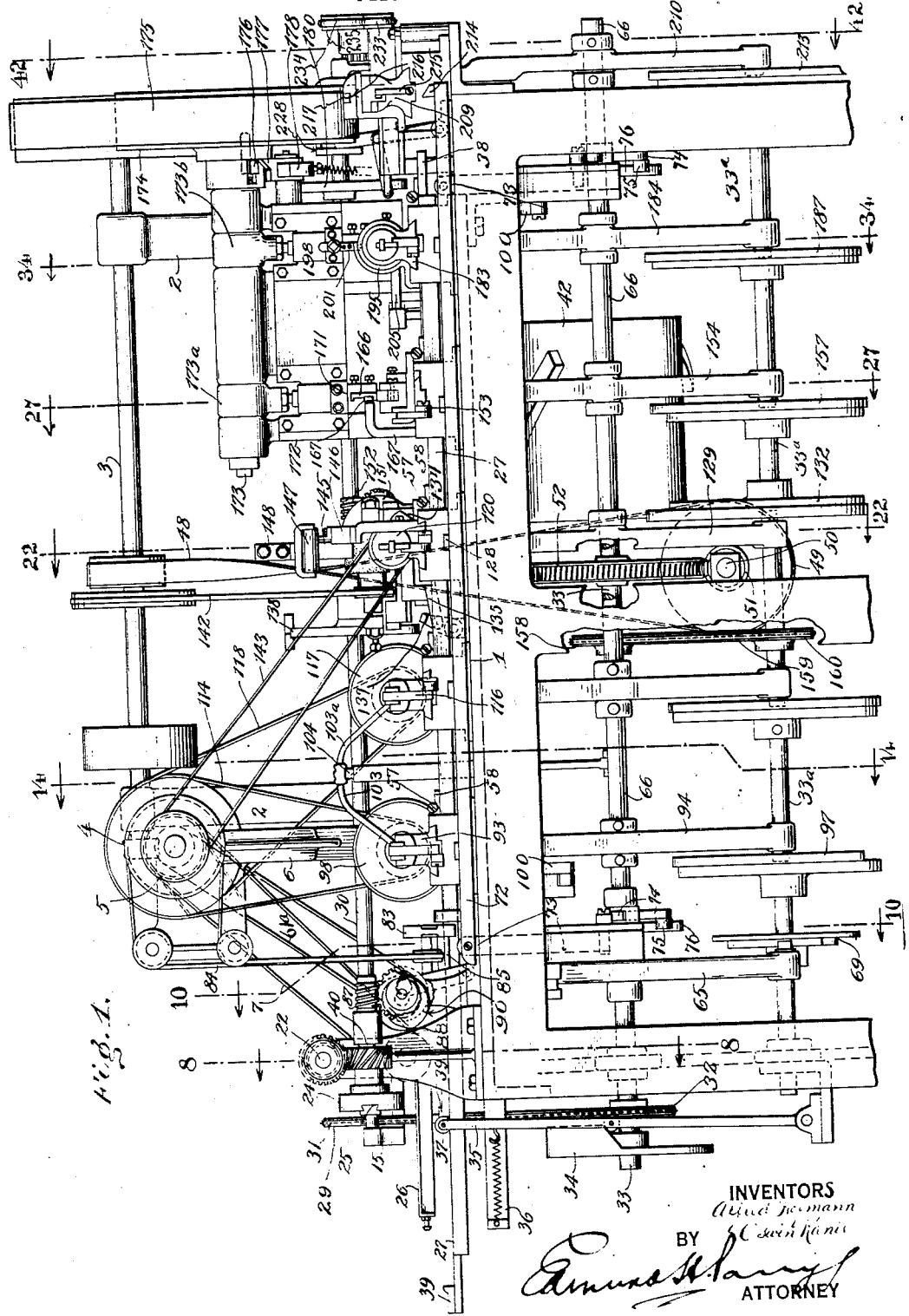
Fig. 1 is a general front elevation of a needle-making machine constructed in accordance with our invention.

The carrier is also reciprocated in a vertical plane by means of arms 46 which are raised and lowered by levers 100 having rollers 101 working on cams 102 mounted on the cam-shaft 33 (Figs. 1, 6 and 14). The arms 46 form a support for the carrier and act merely to elevate the same at predetermined times; but, in its movement in a horizontal plane, the carrier is actuated by the lever 44, independently of the arms 46.

The motion described by the carrier is, therefore, a parallelogram. That is to say, the carrier, being in the elevated position illustrated in Fig. 61, with the carrying-jaws receiving the needles from the chucks, first moves to the right and stops in the position illustrated in Fig. 63. The next chucks now take the needles from the carrying-jaws, which are simultaneously opened, and the carrier drops to the position illustrated in Fig. 65 and moves to that illustrated in Fig. 66 where it remains stationary until the work then being done on the needles in the several chucks has been completed. The carrier then moves to the left and upwardly, the carrying-jaws closing on the needles, this position being that illustrated in Fig. 61.

The needle-carrying jaws 53 are best illustrated in Fig. 15 and in Figs. 60 and 61 to 67. The jaw-members are pivoted on a bracket 54 mounted on the carrier 27, and are held closed by a spring 55. Also pivoted on the bracket 54 is one end of a lever 56 provided at its other end with a cam-roller 57 adapted to ride up on a beveled cam 58 on a bar 38 slidable in the carrier 27. The jaw-members are provided with rollers 59, and the lever 56 has a pointed lug 60 which, upon upward movement of the lever as the roller 57 rides upon the cam 58, enters between the rollers 59 and wedges them apart against action of spring 55, thereby separating the jaw-members.

Motion is imparted to the slidable bar 38, to shift it to the right or left, by a pivoted lever 35 having at its upper end a roller 37 adapted to contact with lugs 39 on the bar. The lever has roller contact with a cam 34 on the cam-shaft 33 (see Fig. 1). Upon rotation of the cam 34, the lever 35 is swung to the right, as indicated by dotted lines in Fig. 61. The roller 37 then contacts with the lug 39 and shifts the bar 38 to the right, thus withdrawing the cams 58 of the several sets of jaws from contact with the rollers 57, whereupon the jaws are closed by action of the springs 55. The carrier 27 then moves to the right to the position indicated in Fig. 63. A spring 36 now swings the lever 35 to the left, the roller 37 thereby contacting with the other lug 39, thus shifting the bar 38 to the left. The cams 58 are now drawn into contact with the rollers 57 and the jaws are therefore separated. In Figs. 65 and 66 the carrier 27 is shown in its lower position, and it is seen that at this time there is no contact between the roller 37 and the lugs 39. When the carrier 27 is again elevated to the position shown in Fig. 61, the cycle is resumed.

*Butt-grinding mechanism.*

As already stated and as will be observed from an inspection of Fig. 58, in the blank-cutting operation the desired length of blank is obtained by severing the wire at two points, thus leaving a short portion which is discarded.

Preferably and as shown, means are provided for rounding off one end of the blank. To that end, the needle, having been cut to proper length, is transported by means of the holder 18 to the chuck of the first station—where the butt-grinding mechanism is located—the chuck being generally indicated by the reference numeral 61 (Figs. 2, 6, 10 and 62). The chuck 61 is slidably mounted upon a block 62 secured to the bed-plate 1 and is adapted to be reciprocated, backward and forward, to present the needle carried thereby to a butt grinding-wheel 63. This motion of the chuck is obtained by means of a lever 64 pivoted to a cam-lever 65 mounted on a shaft 66 (Fig. 11). This cam-lever has a follower 67 which rides in a groove 68 in a cam 69 mounted on the cam-shaft 33ª. The groove in the cam is so designed that the proper backward and forward movement of the chuck is assured as well as the proper timing of that movement.

The groove in the cam is so designed that it will effect, first, a short forward movement of the chuck to a position where it receives the needle from the carrying-jaws. At the instant of receiving the needle, the chuck is stationary, but immediately thereafter its forward movement is continued, and the chuck then presents the needle to the operating instrumentality. While the operation is being performed upon the needle, the chuck remains stationary so far as movement across the base of the machine is concerned, it being understood that the end of the needle is so small and the amount of grinding done so little that it is not necessary to " feed " the needle during the grinding operation. Upon completion of the operation, the chuck retracts to a position where the needle is received by the next pair of carrying-jaws, at which instant the chuck is stationary. The needle having been gripped by these jaws, the chuck continues its backward movement, which terminates at the initial position.

It may here be stated that the several chuck-actuating cams, as herein illustrated in connection with the several units, are shown with the respective followers in the " dwell " position—which lies intermediate of the extreme inward and outward throw of the cams—and with the respective chucks in the position they occupy when they have withdrawn the needles from the respective work devices and at which time the gripper-jaws are in the act of closing on the needles.

The chuck 61 has a movable jaw 70 and a stationary jaw 71 (Fig. 12). These jaws are opened for the reception of the needle and closed to retain it therein by means of a rear operating bar 72ª which is elevated and lowered by a lever 73ª pivoted at 74ª to the front of the machine. This lever is provided with a cam-roller 75ª which works on a cam 76ª mounted upon the cam-shaft 33. The cam 76ª has a comparatively large idle portion, during the travel of which the rear bar 72ª remains in its lower position, and a shorter projecting portion over which the cam-roller 75ª rides in order to elevate the bar to its uppermost position.

The jaws of the chuck are held in closed position by a spring (not shown), and are separated by a plunger-pin 77 (Figs. 2 and 12) provided with a slot 78 fitting over one end of a lever 79 which is pivoted to another lever 80 provided with a roller 81 which rides on a contact-plate 82 secured to the rear bar 72ª. It will be observed from an inspection of Fig. 10 that as the bar 72ª rises, the action of the levers 79 and 80 is to move the plunger-pin 77 into the chuck, thereby opening its jaws against the action of the spring in the same manner as chuck 120 which is more fully illustrated in Fig. 23. When the bar 72ª has been elevated, the chuck advances, the jaws remaining open by reason of the contact of the roller 81 on the contact-piece 82. When the needle has been received in the jaws of the chuck, the bar 72ª drops down, thus effecting a closing of the jaws.

The needle having been received by the chuck 61, the latter continues its forward movement to present to the grinding-wheel 63 the end of the needle which is to be formed with a butt or bend. The chuck 61 is rotated by means of a belt 61ª driven by a pulley on the shaft 5, and thus the needle-blank is rotated while in contact with the grinding wheel (Figs. 1, 2 and 10). This grinding-wheel is rotatably mounted in bearings 83, and receives its motion from a pulley on the shaft 5 through a belt 84 (Figs. 1, 2, 10 and 12). As will be observed from the construction of Figs. 2 and 10, the bearings 83 are mounted on a shaft 85 supported on a slidable block 86. On the shaft 40 is a worm 87 meshing with a gear 88 on a shaft 89 on which is mounted a cam 90. This cam operates a lever 91 secured to the sliding block 86, its purpose being to adjust the grinding-wheel 63 continuously or intermittently, as may be required, so as to use different parts of the wheel for successive operations, thereby obviating frequent dressing of the wheel.

The needle is presented to the grinding-wheel by its proximate chuck which advances and passes the needle through an aperture in a guide 92 mounted on one of the brackets 16.

*First swaging mechanism.*

The end having been ground, the needle is now ready to be transferred for the first swaging operation. The needle-carrying-jaws 53 are first elevated, and take the needle from the butt-grinding-chuck which has been returned to its intermediate position, whereupon the carrier 27 moves to the right and presents the needle to the next adjacent chuck 93 which holds it during this swaging operation. The chuck 93 is mounted for forward and backward sliding movement to introduce the needle into and withdraw it from the swage. The sliding motion is imparted by a lever 94 pivoted on the shaft 66 and provided with a cam-roller 95 working in a groove 96 of a cam 97 mounted on the cam-shaft 33ª (Fig. 14). The groove 96 is so designed that the chuck will be reciprocated in timed relation to other mechanism so as properly to present the needle to a swage 98. The jaws of the chuck 93 are adapted to be opened and closed by the vertical movement of a front bar 72 which engages a spring-pressed lever 99. The bar 72 is elevated through a vertical bar 73 having roller contact with a lever 74 pivoted on the shaft 66 and having a cam-roller 75 working on a cam 76 mounted on the cam-shaft 33.

Just after the needle is swaged and following its retraction from the first swage 98, the needle is, preferably and as shown, heated by means of a gas-jet 103 (Figs. 6 and 14) which is normally supported in an elevated position. During retraction of the needle, the gas-jet dips down by a mechanism now to be described. The gas-jet is supported on a bar 104 slidable in a bracket 105, the lower end of the bar being connected to an arcuate lever 106 having a cam-roller 107 working on a cam 108 on the cam-shaft 33. It will be seen that by this arrangement the gas jet will be lowered at the proper time to heat the needle just after the swaging, to soften it for a subsequent swaging operation, presently to be described.

The first swage comprises a housing 109 (Fig. 19) in which is disposed a rotatable block-supporting member 110, the latter being encompassed by a series of rollers 111 adapted to engage and actuate presser-blocks 112 which, in turn, actuate companion swage-blocks 113; the rollers being separated by a series of spacers 114 mounted on a supporting member 115. This member 115, the spacers, and rollers travel as a mass about the axis of the swage and, also, about the periphery of the member 109, which, with its swage-blocks, turns slowly under the successive impact of the rollers. The block-carrying member 110 is formed with an elongated slot 110ª in which are disposed the two companion swage-blocks 113, each in engagement with the presser-blocks 112, the latter being adapted to be successively engaged at their outer ends by the rollers 111 as they rotate about the swage axis, thereby forcing the swage-blocks toward each other and against the needle being inserted by the chuck and effecting relative movement of the member 109 and its contained blocks. By this arrangement and the fact that the needle is being gradually projected into the swage, it is progressively reduced in diameter and somewhat elongated, as illustrated at C in Fig. 58. The swage-blocks 113 are each provided with a groove 113ª, the needle-receiving end thereof being tapered so that each section of the in-moving needle is engaged thereby and reduced, after which the reduced portion of the needle is projected into an elongated straight portion of the groove.

*Second swaging mechanism.*

The first swaging operation having been completed, the needle is withdrawn from the swage, heated by the gas-jet (as already described), and then picked up by the next set of needle-carrying jaws and thereby transferred to a second swaging operation.

The second swaging is carried out by mechanism including a chuck 116 and a swage 117 (Fig. 21), substantially the same as is employed in the first swaging. However, the chuck 116 which supports the needle at this stage is so arranged that it withdraws the needle from the swage more slowly than is the case with the chuck of the first swaging operation. This is because, as a result of the second swaging, the needle, being thereby materially elongated as well as reduced in diameter, the slow withdrawal will prevent bending of the needle at this point. This motion is effected by a difference in the shape of the groove in the cam.

The swage 117 is like swage 98, and is operated from the same pulley on the shaft 5 by a belt 118, as clearly indicated in Fig. 2.

During withdrawal of the needle from the second swage, it is again heated by a gas-jet 103ª which is operated by the same mechanism as the gas-jet 103 in the case of the first swaging process, for the purpose of softening it for forming the spring beard, because of having been somewhat hardened by the swaging operation.

The swaging completed, the needle is removed from chuck 116 by one of the pairs of needle-carrying-jaws and the carrier 27 moved to the right to effect a further transfer of the needle to the adjacent structure.

Trimming, pointing and buffing mechanism.

Preferably and as shown, the needle is now subjected, at that station, to three operations, namely, trimming, pointing and buffing, and to that end is presented to a chuck 120 (Fig. 22). This chuck has jaws 121 and 122 which are held closed by a spring 123. The lower jaw is formed at its back with a beveled surface 124 which contacts with a plunger-pin 125 operated by means of a link 126 pivoted to a link 127 which carries a roller riding on a contact-plate 128 mounted on the front operating bar 72. Upon upward movement of the bar 72, the plunger-pin 125 moves into the body of the chuck and separates the jaws. The needle having been received by the chuck, the latter moves forward to present the needle for a trimming operation, it being understood that as a result of the second swaging, the needle has become so elongated as to require trimming to the exact length of the ultimate and finished needle. Reciprocatory movement of the chuck 120 for this purpose is effected by a lever 129 (Figs. 22 and 23) pivoted at one end on the shaft 66, and having at its other end a cam-roller 130 working in a groove 131 of a cam 132 mounted on the cam-shaft 33ª. The groove 131 is so designed as to effect forward movement of the chuck at the proper time to present the needle, first for the trimming operation and, then, in turn to pointing and buffing operations.

Upon forward movement of the chuck 120, the needle is first passed through a conical aperture in a guide 133 mounted upon the bed-plate and on which a movable trimming knife 134 is pivoted. The knife 134 coacts with the guide 133 to effect a shearing action, that is to say, the principle of operation is that of scissors. The knife 134 is oscillated in a vertical plane by means of a lever 135 (Fig. 22) operatively connected to a shaft 136 which carries a cam-roller 137 working on a cam 138 mounted on the shaft 30. It will be understood that the cam 138 is so constructed as to effect one complete swinging movement of the knife for each revolution of the shaft 30.

The needle, having now been trimmed to length, is next presented to a grinding-wheel 139 (Fig. 25) for pointing. The grinding-wheel is journaled in a bracket 141 which is both pivotally and slidably mounted on a block 140. The grinding-wheel is rotated by a belt 142 from the main drive-shaft 3. At the same time, the chuck which is then holding the needle to be ground is rotated, this being effected by a belt 143 driven from the shaft 5 and encircling a collar 144 on the chuck. The grinding-wheel is, preferably, operated also to perform a buffing operation.

In Fig. 26 is shown the mechanism for performing the buffing operation and, also, how the chuck is advanced and the grinding-wheel elevated. The elevation of the grinding-wheel is effected by means of a cam 145 adjustably mounted on a bracket 146 secured to the base of the chuck. This cam coacts with a cam-roller 147 mounted on a bracket 148 secured to the bracket 141 which supports the grinding-wheel. It will be seen that as the chuck advances and retracts, the roller 147 will ride up and down on the cam 145, thereby gradually elevating and lowering the grinding-wheel and, thus, insuring buffing the entire length of the needle-point. As in the case of the grinding-wheel in the butt-grinding operation, the wheel 139 is also adjustable laterally thereby to present different portions of the wheel for succeeding operations. This motion of the grinding-wheel is effected by means of a lever 149 having a cam-roller 150 riding on a cam 151 which is rotated through suitable gearing 152 on the shaft 30. The lever 149 is operatively connected to the bracket 141 which is slidable on the block 140.

Butt-forming and groove-punching mechanism.

The needle having now been trimmed to length, pointed and buffed, is ready for the operations of forming it with a butt or bent end and with a noucat or groove. As in the case of the transfer of the needle between the several stations heretofore described, the needle is again grasped by the next pair of carrying-jaws and the carrier 27 moves to the right and thereby transfers the needle to a chuck 153 which holds it during the operations just mentioned and now to be described.

As in the case of the other chucks heretofore described, the chuck 153 is, as illustrated in Fig. 27, slidably mounted for backward and forward movement to present the needle to the instrumentalities now in operation. This sliding movement is effected by a lever 154 pivoted on the shaft 66 and having a cam-roller 155 working in a cam-groove 156 of a cam 157 mounted on the cam-shaft 33ª. The shaft 33 is provided with a sprocket wheel 158 which drives the sprocket chain 159 trained about the sprocket 160 on the shaft 33ª, and this construction and arrangement provides for operating the cam-shafts 33 and 33ª in unison.

The jaws of the chuck 153 are operated by the vertical reciprocation of the front bar 72 which has a contact-piece 161 that engages a roller 162 on a lever 163 which, at one end, forms a jaw-member. The jaws are normally maintained in closed position by means of a spring (not shown). Pivotally mounted upon the chuck 153 is a lever 164 provided at its front end with a roller 165 and on top of the lever is mounted a cam 166. Mounted on the stationary block which supports the chuck is a member 167 having a cam-roller 168 operating in a groove in a cam 166. By referring to Figs. 29 to 33, inclusive, the operation of rolling down the butt-end will be clear. The needle is supported in the chuck as illustrated in Fig. 29 with the butt-end of the needle in contact with a stop 164$^a$ on the lever 164. As the chuck advances, the lever 164 is depressed by reason of the movement of the cam-follower 168 and the cam 166, and therefore the roller 165 is also depressed and bends down the end of the needle over the face of the lower jaw-member 163$^a$ and into a vertical groove in the rear face of this jaw-member, as illustrated in Fig. 30.

The chuck continues to advance to present the needle to the groove-punching mechanism. This comprises an anvil 169 adjustably supported, as by thumb-screws, in a bracket 170 on the bed-plate of the machine, and a movable punch or die 171 cooperating with the anvil. The anvil is preferably of the shape illustrated in Fig. 28, and is provided with a depressed central portion 169$^a$ and with needle-retaining grooves 169$^b$ in the upstanding end portion, this construction of the anvil permitting reversibility in use. The chuck continues to advance so that the needle will rest in these grooves. The grooves 169$^b$ not only serve accurately to hold the needle during the noucat forming operation, but they also effectually prevent expansion of the metal at the sides of the noucat. The mechanism for operating the movable groove-punch or die 171 will now be described.

Mounted on the bed-plate are brackets 172 which support a crank-shaft 173 on which is mounted a pair of cranks 173$^a$, 173$^b$, and a fly-wheel 174 which receives its motion from the shaft 3 through a belt 175. The fly-wheel 174 is normally loose on the shaft 173 but may be clutched thereto by means of a spring-pressed latch 176 (Figs. 7, 42, 42$^a$, 42$^b$) which is normally held in retracted position by a beveled catch 177 secured to a lever 178. This lever is provided with a cam-roller 179 riding on a cam 180 mounted on the shaft 30. The roller is held in contact with the cam by a spring 181. It will be seen that, by this arrangement, the cam 180 will, once in each revolution, trip the lever 178, thereby withdrawing the catch 177 permitting the latch 176 to engage one or another of a series of pins or outstanding elements 176$^a$ in an annular recess 176$^b$ on the inner side of the fly-wheel and concentric with its shaft. The provision of four of these elements 176$^a$ permits the latch to engage one or another thereof as the fly-wheel rotates, insuring prompt operable connection of the fly-wheel 174 with the crank-shaft 173 by means of the latch 176. In consequence, the movable punch 171, which is connected to the crank 173$^a$ on the shaft 173, will drop down and punch the noucat or groove in the needle. During this operation, the needle is held in the grooves 169$^b$ in the anvil 169 by means of a spring-pressed finger or presserfoot 182.

*Needle-flattening mechanism.*

The grooving operation completed, the chuck withdraws the needle from the punch, and it is again picked up by the next set of needle-carrying jaws to be transported by movement of the carrier 27 to the next station which includes a chuck 183 that supports the needle during the flattening operation presently to be described. However, since the butt-end has then been bent down and is seated in its forming-groove in the lower chuck-jaw and, as a consequence, has to be removed from its chuck somewhat sidewise, it is desirable that the chuck at this station shall operate somewhat differently from those which have already been described. When the chuck 153 shall have been retracted so as to position the needle away from the punch, it will momentarily remain stationary while the next set of carrying-jaws on the carrier is being positioned opposite the chuck. As soon as these jaws have engaged the needle, the chuck will begin to open and, at the same time, advance slightly to free itself and its butt-seating groove entirely of the depending butt of the needle. The carrier will then, with the needle in the carrying-jaws, move toward the right carrying the needle sidewise over the upper face of the lower chuck-jaw and on to the chuck 183 of the needle-flattening station.

This chuck 183 is, like the other chucks heretofore described, slidably mounted for backward and forward movement to present the needle to its proximate operating mechanism. This sliding movement of the chuck is effected by means of a lever 184 mounted on the shaft 66 and having a cam-roller 185 working in a groove 186 in a cam 187 mounted on the cam-shaft 33$^a$. The jaws of this chuck are normally held closed by means of a spring (not shown), and are opened by movement of a plunger-pin 188 which contacts with the beveled end 189 of the lower jaw-member. The plunger-pin is operated by a lever 190 which is connected to a lever 191 having a roller 192 adapted to ride on a contact-piece 193 on the front operating bar 72. Upward movement of the bar 72 effects movements of the levers 190 and 191, as a result of which the plunger-pin 188 is forced against the bevel face 189 of the lower jaw-member of the chuck, thereby separating the jaws.

It will be understood that as the flattening of the needle must be in exactly the same plane as this rolled down end, and as the needle is then held in this chuck with the rolled down end or butt in vertical position, it is necessary to give the needle a quarter turn. This is effected by means of a collar 194 (Fig. 35) surrounding the chuck and having a cam-slot 195 in which is engaged a follower 196 secured to the chuck. The collar 194 remains relatively stationary while the chuck advances and, by reason of the cam-slot 195 operating the follower 196, the chuck and, thus, the needle, will be given the desired quarter turn. During the forward movement of the chuck, the needle is presented to a needle-flattening anvil 197. The needle then resting on the anvil is in position to have its sides flattened. Preferably and as shown, the flattening is accomplished by a movable die or hammer 198 which is actuated by the crank 173$^b$ on the shaft 173 in the same manner and at the same time as the crank 173$^a$ operates the groove-punch heretofore described. If, however, the movable hammer were to strike the needle while it is held rigidly by the jaws of the chuck there might result an undesirable bending of the shank of the needle. In order to obviate this, we have provided the movable hammer with a lug 199 adapted, when it descends, to contact with a pin 200 on the chuck. This operates slightly to separate the jaws against the action of the spring at the instant the hammer strikes, as clearly illustrated in Fig. 36. This figure illustrates the mechanism at the instant the hammer has struck and the flattening has taken place.

It will also be evident that when the needle is flattened it may be somewhat elongated and, in consequence, if it were held rigidly in the jaws at this time, there might result a bending or distortion of the bent end or butt. To overcome this we have provided the movable hammer with a second lug 201 which contacts with an adjustable headed-element 202 secured to a collar 203 on the chuck. When the lug 201 contacts with the element 202, the chuck will thereby be slightly actuated away from the anvil and hammer, against the action of a spring 204, this action taking place just subsequent to the opening of the chuck-jaws. The spring will then restore the chuck to its position when the contact between the lugs is broken.

In order to insure proper placing of the needle on the anvil 197, we have provided a guide 205 pivoted at one end at 206 and provided, at its other end, with a cam-roller 207 working on a cam 208 mounted on the shaft 30. The position of this guide when the needle is placed on the block is illustrated by dotted lines in Fig. 34, in which position it remains only for an instant while the needle is moving to the anvil 197.

It is to be noted that the flattening imparts to the shank of the needle a wedge shape, with the wider end near the noucat, as illustrated at L, Fig. 59.

It will be understood that when the chuck retracts, the needle is returned to its original position by the action of the follower 196 in the cam slot 195.

It is manifest that, by reason of the fact that the noucat-punch and the flattening-hammer are both operated by cranks mounted on and actuated by the same shaft, their action is precisely timed for simultaneous movement; hence, they act on their respective needles at exactly the same instant and with the same degree of power, with consequent uniformity of results on all needles treated.

The needle, now having been flattened, is released by the chuck and gripped by one of the pairs of needle-carrying jaws which, by motion of the carrier 27 to the right, transfers the needle to the next station.

*Beard-forming mechanism.*

At this station, the beard is, preferably and as shown, formed and to that end the needle is taken by a chuck 209 constituting a component of the station. This chuck 209 is slidably mounted for movement toward and away from the beard-forming mechanism. This movement is effected by a lever 210 pivoted on the shaft 66 and provided at one end with a cam-roller 211 working in a cam-groove 212 in a cam 213 mounted on the cam-shaft 33$^a$. The groove 212 is so shaped as to effect the proper presentation of the needle to the beard-forming mechanism in timed relation to the other parts of the machine. The jaws of the chuck 209 are opened and closed by a beveled cam 214 on the bar 72, which cam contacts with a pivoted lever 215 which forms one of the jaw-members (Figs. 40 and 41).

To insure proper alinement of the needle with the beard-forming mechanism, we have provided a bracket 216 on which is pivotally mounted a lever 217 having at its forward end a bent-down finger 218. On the lower surface of the lever 217 is a cam 219 cooperating with a contact-piece 220 on the chuck, the arrangement being such that, as the chuck advances, the finger 218 is lowered (by gravity) to proper position to aline the needle with an anvil 221 of the beard-forming mechanism. When the chuck retracts, the lever 217 is elevated to normal position. The mandrel 223 (Fig. 45) moves to the right and covers the groove in the anvil. The needle is then brought forward into groove 222 and under the mandrel. This positioning motion of the mandrel is effected by means of links 224 and 225 (Fig. 7) which are operably connected to a lever 226 having a cam-roller 227 working in a groove in a cam 228 mounted on the shaft 30. The needle being covered by the mandrel 223, a hold-down finger 229 now is lowered to aid in maintaining the needle in proper position. This finger is normally held in elevated position by a spring (not shown), and is depressed by a lever 230 operated by a cam 231 mounted on the shaft 30.

A beard-forming member 232 is now rotated and forms the beard by bending the needle over the mandrel 223, as illustrated in Fig. 47. The shape of the beard-forming member is clearly shown in Fig. 48. This beard-forming member is provided with a shaft having a pulley 233 connected by a belt 234 trained and fixed to a pulley 235 which is connected by gearing to a cam-follower 236 working on the cam 231. The belt 234 is fixed to the pulleys 233 and 235, and the cam 231 is so grooved that, upon rotation of the shaft 30, the beard-forming member 232 is given only a half turn, from the position indicated in Fig. 46 to that shown in Fig. 47, the beard being thus formed, whereupon the member 232 returns to its inoperative position. The finger 229 is then elevated, the mandrel 223 is withdrawn by movement to the left, and the chuck then removes the needle from the anvil 221. These steps are illustrated diagrammatically in Fig. 45, in which the first view shows the needle in position on the anvil; the second view shows the mandrel positioned to cover the needle; and the third view shows the beard-forming member rotated the required half turn. The beard having been formed, the action of the mechanism is reversed to restore the parts to normal position.

The needle will now have been completely formed; that is to say, it will have a bent-end or butt, the extremity of which is nicely and accurately rounded off; it will have its opposite end pointed and a portion reduced in its diametral dimensions and turned back upon itself to constitute the beard; it will be provided with a noucat or groove underlying the pointed portion of the beard; and it will be flattened at its sides in precise relation to the butt and beard, these latter being also precisely alined. As thus formed, it is ready for certain finishing operations.

In the delivery of needles by the carrying-jaws on the carrier 27 to the different chucks and, then, during the return of the needles from the chucks to such jaws, it is desirable to guard against any inaccuracy in the action or position of these parts during such operation. We have, therefore, in the present instance provided for this in the following manner:

As schematically illustrated at A in Fig. 60, each needle is initially, but momentarily, held by the carrying-jaws between but out of working engagement with the chuck and its respective operating-unit. Now, to recapitulate, somewhat, the description of the coaction of these parts, it may be noted that the chuck will, as it advances, take the needle as at B, Fig. 60—when the carrying-jaws open and release it—and present it to and hold it positioned in the unit while that unit performs its appropriate action on the needle, as at C, Fig. 60. Retraction of the chuck, then, re-positions it for delivery of the needle to another set of the carrying-jaws which, by their movement to the right, positions the needle to be taken by the chuck of the next station. These operations are all illustrated in Fig. 60. Now, by reason of the treatment which the needle receives in the unit, its lengthwise dimensions may be elongated; in addition, during the transfer of the needle from the chuck to the carrying-jaws, its required relative position with respect to those carrying jaws may be somewhat disturbed. It is important, if not essential, for precision of positioning of and operation on the needle for production of a perfect product, that the needle, when it is to be taken by any particular chuck, shall be entirely "home" therein—as shown at B, Fig. 60—before its jaws close on the needle and the chuck advances. To insure this condition, we have arranged that the chuck, as soon as it releases its needle, shall continue its retracting movement somewhat beyond what might be regarded as its normal or true starting position represented at A, Fig. 60. Then, when the chuck is to take its next needle, it advances from its rearmost or abnormal position—represented at E, Fig. 60—to its normal starting position and, continuing its advance, takes the needle from the carrying-jaws and presents it to its respective unit. The abnormal retraction of the chuck—illustrated at E, Fig. 60—insures that the needle shall be "home" therein when the chuck-jaws close on it. If the needle happened to be somewhat elongated, or if its position has been disturbed, there would be danger of the needle—if its chuck-end were too near the chuck—being damaged or otherwise affected when the chuck advances to take the needle from the carrying-jaws. By providing for the abnormal retracting movement of the chuck, this danger is obviated. The action of the chucks, under these circumstances, is accomplished through their operating-cams, already described, the actuating cam-surfaces thereof being formed to effectuate this purpose.

*Removing and tempering mechanism.*

Preferably and as shown, these finishing operations, in this instance, include tempering the needle. To that end, it is transferred to a finishing station, preferably in the same machine.

The mechanism for removing the finished needle from the last of the series of carrying-jaws and for tempering it is illustrated in Figs. 68 to 72. Mounted on the cam-shaft 33 is a cam 270, and pivoted on the shaft 66 is one end of a lever 271 having at its other end a cam-roller 272 riding on the cam 270. This cam has a large idle portion, then a sharp rise, followed by a shorter idle portion and, finally, a sharp descent. Its action is, therefore, first to raise the lever 271 to a predetermined elevation, then to maintain it for a predetermined time at this elevation, and finally to allow it to drop suddenly to its initial position. Fixed to the lever 271 is a vertically extending lever 273 which, at its upper end, is pivoted at 274 to a take-off device 275. The device is pivoted at 276 on a bracket 277 supported on the bed-plate of the machine. It will now be understood that the action of the cam 270 is to elevate the lever 273 which will, therefore, swing the take-off device 275 about the pivot 276, elevating it from the full-line position in Fig. 68 to the position therein shown in dotted lines. It will be noted from an inspection of Fig. 72 that the front end of the take-off device 275 is bifurcated, that is, it is provided with a U-shaped opening.

When the beard-forming operation has been completed, the needle is received by the last of the pairs of carrying-jaws 53, and the carrier 27 is shifted to the right. The take-off device is now elevated and is so positioned that the carrying-jaws will come to rest in the U-shaped opening, as shown in Fig. 69. These jaws will then be opened, and the carrier 27 descend to its lower position, as indicated by the arrow in Fig. 70. This will leave the needle resting on the take-off device, as illustrated in Fig. 72. Then it will be tripped by action of the cam 270 assuming the full-line position in Fig. 68 whereby the needle will slide off and drop into an electric heater 278. This heater is provided with a hinged top 279 and a hinged bottom 280 which are arranged to be alternately swung to open and closed positions. That is to say, the top is first raised to permit the needle to drop into the heater and is then closed. After the needle has been in the heater a predetermined length of time, the bottom is swung down, to permit the needle to drop into an oil-bath 281 to be tempered, whereupon the bottom swings up to closed position.

The hinged top 279 is operated by a lever 282 pivoted intermediate its ends. This lever is connected at one end to the top and, at the other end, it is provided with a cam-roller 283 on a notched cam 284 on the cam-shaft 33. It will be noted that the shape of the cam is such that the top will remain closed for the greater part of the travel of the cam. When the roller 283 descends into the notch, a spring 285 will raise the lever 282 and, thus, elevate the top; when the roller rides up and out of the notch, the lever is restored to its initial position, closing the top.

The bottom 280 is operated by means of a rod 286 connected at one end to the bottom and, at its other end, to a pivoted lever 287 having a cam-roller 288 working on a notched cam 289 on the cam-shaft 33. A spring 290 serves to swing the lever 287 about its pivot when the roller 288 enters the notch in the cam. This movement of the lever will draw the bar 286 down, thereby opening the bottom 280 of the heater. The bottom remains open only for an instant and is returned to closed position when the roller 288 rides out of the notch and onto the periphery of the cam.

After a predetermined time, preferably, the accumulated needles which have been deposited in the oil-bath 281, and have, thus, been tempered, are removed therefrom in any suitable manner. Except, perhaps, for inspection, these needles will then be entirely finished products and ready for use in a knitting-machine. The needles will all be entirely uniform and perfect in character, dimensions, form and grade, and be the product of a series of operations all performed in the one machine and as a continuous procedure, from the cutting of the blank to the beard-forming and/or tempering.

Our inventive-concept is characterized by both apparatus and the method with which such apparatus is utilized. As a method, it includes a series of related steps successively performed, commencing with the cutting of a blank to needle-length, then treating certain portions thereof, both to form the needle and, also, to develop it with nice precision; and, finally, subjecting it to finishing operations.

*Operation.*

Although the operation of the machine, in its entirety, will now be more or less readily understood from the foregoing description, the following résumé is nevertheless deemed desirable:

Initially, and assuming that the machine is about to be started and that the wire has been supplied from a reel, threaded through the straightener 8, and inserted into the conveyor 13, the machine is put into operation, power being supplied to the main-shaft 3 by any convenient and well-known means. The shaft 22 then being in rotation and by reason of its connection with the disk 24, the conveyor 13 inserts the wire through the tube 17 and, thence, into the blank-holder 18 and, thus, presents it to the cutting-knives 19 and 20. The movable knives 20 are depressed by the cams 21, thus cutting the wire in two places, as indicated at A in Fig. 58, to produce the first blank. At this time, the initial transfer-bar 26 and the carrier 27 are in the position illustrated in Fig. 61; that is to say, the transfer-bar is in its left-hand position—the position which it occupies for the blank-cutting operation, and with the blank in the holder 18—while the carrier 27 is also at its extreme left-hand position. Longitudinal movement of the carrier toward the right, by the operating mechanism hereinbefore detailed, effects movement of the initial transfer-bar 26, and with it the needle-blank-holder 18, toward the right and to a position to permit the holder 18 to deliver its blank to the first chuck 61, that of the butt-end grinding station. Continued movement of the carrier, first downwardly and then toward the left, locates each set of carrying-jaws at their respective "idle" positions and, in the meantime, releases the initial transfer-bar 26 so that it may return to its original position for a second blank-cutting operation.

As the machine continues to operate, the carrier 27 will move from the "idle" position of its carrying-jaws toward the left and up, so that its respective carrying-jaws will then be in their upper position, ready to receive needles.

As soon as the carrying-jaws close and grasp the needles, the carrier moves to the right and thereby presents the needles in alinement with the respective chucks. In this way, the first needle which has been in the first chuck 61 will be delivered to the first set of carrying-jaws and, as the carrier moves to the right, will thereby be presented to the second set of carrying-jaws, and so on. Thus, the initial transfer-bar and the carrier 27 will operate in a cycle to transfer needles, the first-mentioned instrumentality presenting these to the chuck 61, while the carrier, by means of the series of sets of carrying-jaws thereon, transfers needles from chuck to chuck.

It will, therefore, be understood that, while one set of carrying-jaws of the carrier 27 is transferring a needle from the first station—from the butt-grinding operation—the initial transfer mechanism is, likewise, delivering a blank to the chuck 61. Similarly, in the course of a few moments after the machine started, a series of needles will be simultaneously transferred from station to station by the carrier and thereby delivered to the appropriate chucks at these stations, and then by these chucks presented to and withdrawn from the station-operating-instrumentalities. In consequence, there will be a plurality of needles either under way to stations or under operation at the stations. To that end, the carrier operates in a cycle, whereby these working conditions may be continuously maintained, and with great precision, to insure perfect results.

The needle having been presented to the first chuck 61, the latter advances it to the butt-grinding wheel 63 where the butt-end is rounded off. This operation completed, the chuck retracts, still holding the needle, and the first pair of carrying-jaws grasp the needle and transport it to the right by motion of the carrier 27, presenting it to the second chuck 93 which holds the needle during the first swaging. As the chuck retracts from this first swage, it is heated by means of the gas-jet which, at that instant, dips down to it. The chuck 93, being then in retracted position, the second pair of carrying-jaws grasp the needle and, by motion of the carrier 27, carry it to the right, presenting it to the third chuck 116 which holds the needle during the second swaging.

Upon completion of the second swaging, the needle is withdrawn from the swage, more slowly than after the first swaging, and during which it is heated for the second time. Then, when the chuck 116 is in its retracted position, the third pair of carrying-jaws are elevated, grasp the needle and, by motion of the carrier 27, transfer it to the right, presenting it to the fourth chuck 120.

This chuck holds the needle during the trimming, pointing and buffing operations. The chuck first advances, presenting the needle to the knife 134 which trims it to proper length and rendered necessary because of its elongation during swaging. The chuck, continuing to advance, presents the needle to the grinding-wheel 139, by which the needle is pointed, after which the chuck with its needle is retracted. Then the chuck again advances while the grinding-wheel is slightly elevated by the action of the roller 147 and the cam 145, and effects buffing of the portion of the needle that has previously been swaged.

Upon completion of the buffing, the chuck withdraws the needle, and the fourth pair of carrying-jaws grasp it. The carrier 27 again moves to the right, and the needle is presented to the fifth chuck 153, by which it is held during the operation of rolling down the butt-end and punching the groove. The needle is held in the jaws of chuck 153 and, as the chuck advances, the roller 165 is depressed by reason of the coaction of the cam 166 and the cam-roller 168, thus rolling down and forming the butt-end. The needle is then advanced by the chuck 153, and rests on the anvil 169 of the groove-punch. At this time, the beveled catch 177 releases the spring-latch 176, whereby the fly-wheel 174 is clutched to the crank-shaft 173, and the cranks thereon are actuated, the first to the left, to drop with considerable force the movable punch or die 171. Upon completion of one rotation of the fly-wheel, the spring-latch is again held out of operative position by the catch 177 so that, upon each rotation of the fly-wheel, the punch strikes only once and is then by its crank elevated to inoperative position.

The noucat or groove having been formed in the needle, the chuck 153 retracts, withdrawing the needle, whereupon the fifth pair of carrying-jaws grasp it and, by motion of the carrier 27, transfer it to the sixth chuck 183. This chuck holds the needle during the flattening operation. It will be noted that at this time the butt-end of the needle has been rolled down and, since the flattening must occur in the same plane as the rolled down end, it is necessary to give the needle a quarter turn before it is struck by the hammer. This is accomplished by means of the cam 195 in which works the follower 196, whereby the desired turn is made as the chuck 183 advances. The needle is now, by the clutch, placed in position on the anvil 197 and the hammer 198 is dropped. This latter, it will be recalled, is accomplished by the fly-wheel 174 when it is clutched to the crank-shaft 173 and actuates both cranks, including that which actuates the flattening hammer. It has been pointed out that, in order to prevent bending or distortion of the needle at this stage, it is essential that it be released from and be free in the jaws of the chuck. This result is attained through contact of the lug 199 with the pin 200, as the hammer descends. Since at this time there is also a slight elongation of the needle, which would result in a further bending of the butt-end if the needle were rigidly held in the chuck, the jaws of the chuck are, therefore, slightly retracted by means of the contact of the lug 201 with the pin 200.

The needle, having been flattened, is now withdrawn by retracting the chuck, and is grasped by the sixth pair of needle-carrying jaws and transferred thereby to the seventh chuck 209. This chuck holds the needle during the beard-forming process. The mandrel 223 moves to the right and covers the groove in the anvil. The needle is then brought forward into groove 222 and under the mandrel. At this time the finger 229 descends to aid in holding the needle in place. The beard-forming member 232 is then given a half turn and bends the pointed end of the needle over the mandrel 223, thus forming the beard. The member 232 is now reversed, the finger elevated, and the mandrel moves to the left to its inoperative position. The needle will now have been completely formed and, when the chuck 209 is retracted, is grasped by the last pair of needle-carrying jaws, of the needle-forming section of the machine, and transported to the take-off device which receives the needle and drops it into the electric-heater wherein it remains a predetermined length of time, after which the bottom of the heater is swung away and the needle drops into the oil tempering bath.

Thus, it will be observed that, following the preliminary operations of straightening the wire, cutting a blank to needle-length, etc., the needle is, for the forming procedure, successively transferred to and from each of the seven stations; that while at each of the stations, it is subjected to the action of an appropriate instrumentality; that, when formed, it is further transferred, for the finishing procedure, to the heater and, thence, to the tempering bath; and that movement of the initial and main transfer mechanisms and actuation of the chucks and operating instrumentalities at the several stations are effected in precise synchronism.

*Structural modifications.*

In some instances, we may elect to utilize other types of mechanism than those heretofore described, in the nature of modified structures, and some of these will now be explained:

In Figs. 49 and 50, we have illustrated a modification of the mechanism for adjusting the grinding-wheels in the butt-grinding and in the pointing and buffing operations. As here illustrated, the grinding-wheel 240 is journaled in a pivoted bracket 241, the angle of which may be adjusted by means of a thumb screw 242 against the action of a spring 243. The adjustment is to permit variation in the rounding off of the butt-end, so that much or little may be ground off. The setting would, however, be in accordance with the degree of reduction requisite to fit the butt into its hole in the needle-bar of the knitting-machine. The bracket 241 is mounted on a base 244 slidable on a support 245. The bracket 241 is moved laterally by means of a rotatable shaft 246, upon which is mounted a ratchet-wheel 247 which is given a step-by-step movement by a pawl 248 pivoted on a lever 249 which has a cam-roller 250 working on a cam 251. As shown in Fig. 49, rotation of the shaft 246 rotates a pinion 252 which operates the rack 253 and thereby moves the bracket 241, thus adjusting the grinding-wheel. In this instance, movement of the grinding-wheel is periodic as distinguished from the continuous movement of the grinding-wheel heretofore described. By this arrangement frequent redressing of the grinding-wheel is obviated.

In Figs. 51 to 54, inclusive, we have illustrated a modified form of chuck for holding the needle in the swaging operations. In this modification, an upper jaw-member 254 is pivoted at 255 and normally held in closed position by means of a spring (not shown). A lever 256 is pivoted at 257, and has a roller 258 which rides on a contact-piece on the front operating-bar 72. When this bar 72 is elevated, the lever 256 swings on its pivot 257 and contacts with an adjustable screw 259 on the upper jaw-member 254, thereby opening the jaws against the action of the spring. The adjusting-screw permits variation in the degree of gripping pressure of the jaws on the needle. Figs. 53 and 54 illustrate the jaw-members in closed position; Fig. 53 being a section and Fig. 54 a front view.

In Figs. 55 to 57, we have illustrated a modified form of needle-carrying jaws. In this construction, the arrangement of parts and the actuating mechanism are similar to the jaw-carrying-members heretofore described, the difference being found in the jaws, proper. These jaws are best illustrated in Figs. 56 and 57. One of the jaw-members is provided with projections 260 which, when the jaws are closed, enter into recesses 261 in the other jaw-members. By this arrangement, the needles are more securely retained in the carrier.

What we claim is:

1. The method of making a spring-beard needle which consists in cutting from wire a blank of predetermined length, rounding the butt-end of the blank, swaging the beard-end, trimming to length, pointing and buffing the beard-end, bending the butt-end, grooving the beard-end, flattening the shank, and forming a spring-beard.

2. In a needle-making machine, a machine-base, a series of operating units disposed longitudinally thereof, a carrier having reciprocatory movement longitudinally of the base and adapted to transfer a needle-blank to each of the units successively, and means to operate the units successively to cut a blank, round the butt-end thereof, swage the beard-end, trim to length, point and buff, bend the butt-end, punch a groove in the beard-end, flatten the shank, and form the beard.

3. In a needle-making machine, a machine-base, a series of operating units disposed longitudinally thereof, a carrier having reciprocatory movement longitudinally of the base and adapted to transfer a needle-blank to each of the units successively, means to operate the units successively to cut a blank, round the butt-end thereof, swage the beard-end, trim to length, point and buff, bend the butt-end, punch a groove in the beard-end, flatten the shank, and form the beard, and means to remove the finished needle and transfer it to a tempering unit.

4. In a needle-making machine, a machine-base, a carrier having reciprocatory movement longitudinally of the base, a series of operating units disposed parallel to the path of movement of said carrier, each unit actuatable to produce its respective action upon a needle-blank, a plurality of the units operating simultaneously, mechanism for operating each unit, mechanism for operating the carrier, and means common to said mechanisms for actuating them in synchronism, one of said units operative to feed wire to the machine and effect a straightening thereof, another of said units cutting the wire to a predetermined length, another unit effecting rounding of the butt-end of the blank, another unit swaging the beard-end, another unit effecting the three functions of trimming to length, pointing and buffing, another unit effecting the two functions of bending down the butt-end and forming the groove, another unit flattening the shank of the needle, and still another unit forming the spring-beard.

5. In a needle-making machine, means for feeding wire to the machine, means for cutting predetermined lengths therefrom to form needle-blanks, means for rounding the butt-end of the blank, means for swaging the beard-end, means for trimming the blank to proper length, means for pointing and buffing the beard-end, means for rolling down the butt-end, means for forming a groove in the beard-end, means for flattening the shank portion, means for forming the spring-beard, a carrier adapted to transfer the needle-blank successively to each of said means, mechanism for operating said carrier, and means common to said mechanism and said operating means for operating them simultaneously and in synchronism.

6. In a needle-making machine, a machine-base, a carrier having reciprocatory movement longitudinally of the base, a series of operating units disposed parallel to the path of movement of the carrier, each unit actuatable to produce its respective action on a needle-blank including the forming of a butt-end thereon, a plurality of the units operating simultaneously, mechanism for operating each unit, mechanism for operating the carrier, and means common to said mechanisms for actuating them in synchronism, one of said units comprising a mechanism for finishing the butt-end of the blank.

7. In a needle-making machine, a machine-base, a carrier having reciprocatory movement longitudinally of the base, a series of operating units disposed parallel to the path of movement of the carrier, each unit actuatable to produce its respective action on a needle-blank, a plurality of the units operating simultaneously, mechanism for operating each unit, mechanism for operating the carrier, and means common to said mechanisms for actuating them in synchronism, one of said units comprising a mechanism for swaging the blank to reduce a selected portion of it to a smaller diameter.

8. In a needle-making machine, a machine-base, a carrier having reciprocatory movement longitudinally of the base, a series of operating units disposed parallel to the path of movement of the carrier, each unit actuatable to produce its respective action on a needle-blank, a plurality of the units operating simultaneously, mechanism for operating each unit, mechanism for operating the carrier, and one of said units comprising a mechanism common to said mechanisms for actuating them in synchronism, and another of said units comprising a mechanism for swaging a selected portion of the blank to reduce it to a smaller diameter for pointing the end of the blank, and means for trimming the blank to predeter mined needle-length.

9. In a needle-making machine, a machine-base, a carrier having reciprocatory movement longitudinally of the base, a series of operating units disposed parallel to the path of movement of the carrier, each unit actuatable to produce its respective action on a needle-blank, a plurality of the units operating simultaneously, mechanism for operating each unit, mechanism for operating the carrier, means common to said mechanisms for actuating them in synchronism, means for swaging a selected portion of the blank to reduce it to a smaller diameter, means for forming a noucat in the blank, means for bending one end thereof to form a butt thereon, means for forming a spring-beard on the other end, and means associated with said noucat-forming mechanism to control the expanding of the metal of the noucat-section of the blank beyond a predetermined diameter.

10. In a needle-making machine, a machine-base, a carrier having reciprocatory movement longitudinally of the base, a series of operating units disposed parallel to the path of movement of the carrier, each unit actuatable to produce its respective action on a needle-blank, a plurality of the units operating simultaneously, mechanism for operating each unit, mechanism for operating the carrier, means common to said mechanisms for actuating them in synchronism, means for swaging a selected portion of the blank to reduce it to a smaller diameter, means for forming a noucat in the blank, means for bending one end thereof to form a butt thereon, means for forming a spring-beard on the other end, means associated with said noucat-forming mechanism to control the expanding of the metal of the noucat-section of the blank beyond a predetermined diameter, and means for maintaining the blank in a predetermined position while under operation to insure the butt, noucat and spring-beard being disposed in a predetermined relative plane.

11. In a needle-making machine, a machine-base, a carrier having reciprocatory movement longitudinally of the base, a series of operating units disposed parallel to the path of movement of the carrier, each unit actuatable to produce its respective action on a needle-blank, a plurality of the units operating simultaneously, mechanism for operating each unit, mechanism for operating the carrier, means common to said mechanisms for actuating them in synchronism, means for swaging a selected portion of the blank to reduce it to a smaller diameter, means for forming a noucat in the blank, means for bending one end thereof to form a butt thereon, means for forming a spring-beard on the other end, means associated with said noucat-forming mechanism to control the expanding of the metal of the noucat-section of the blank beyond a predetermined diameter, and means for flattening selected portions of the sides of the blank, the resultant flattened sides lying in a plane parallel to those of the butt and beard.

12. In a needle-making machine, a machine-base, a carrier having reciprocatory movement longitudinally of the base, a series of operating units disposed parallel to the path of movement of the carrier, each unit actuatable to produce its respective action on a needle-blank, a plurality of the units operating simultaneously, mechanism for operating each unit, mechanism for operating the carrier, means common to said mechanism for actuating them in synchronism, means for swaging a selected portion of the blank to reduce it to a smaller diameter, means for forming a noucat in the blank, means for bending one end thereof to form a butt thereon, means for forming a spring-beard on the other end, means associated with said noucat-forming-mechanism to control the expanding of the metal of the noucat-section of the blank beyond a predetermined diameter, means for flattening selected portions of the sides of the blank, the resultant flattened sides lying in a plane parallel to those of the butt and beard, and means for positioning the blank in relation to certain of said units whereby, during the formation of the butt, noucat, beard, and flattened sides, the blank will be maintained in predetermined planes.

13. In a needle-making machine, a machine-base, a plurality of units disposed longitudinally of the base, each unit actuatable to produce its particular action on a needle-blank, a plurality of work-holders disposed on the base in parallelism to said units, each having reciprocatory movement transversely of the base and in relation to its respective unit to present a needle-blank held thereby to a unit and withdraw it therefrom, and means to transfer a needle-blank to each of said work-holders successively.

14. In a needle-making machine, a machine-base, a plurality of operating units disposed longitudinally thereof, each unit actuatable to produce its particular action on a needle-blank, a plurality of work-holders disposed on the base in parallelism to said units and having reciprocatory movement transversely of the base to present a needle-blank held thereby to a unit and withdraw it therefrom, a carrier for transferring a needle-blank to each of said work-holders successively, means for actuating said units, means for operating said carrier, means for moving said work-holders, and mechanism common to all said means to effect their operation simultaneously and in synchronism.

15. In a needle-making machine, a machine-base, a plurality of operating units disposed longitudinally of the base, each unit actuatable to effect its particular action on a needle-blank to produce a finished needle, one of said units comprising a tempering-mechanism, a carrier having reciprocatory movement longitudinally of the base and adapted to transfer the needle-blank from unit to unit, and means to remove the finished needle from the carrier and to transfer it to the tempering mechanism.

16. In a needle-making machine, a machine-base, a plurality of operating units disposed longitudinally of the base, each unit actuatable to produce its particular action on a needle-blank, a carrier having reciprocatory movement longitudinally of the base and adapted to transfer the needle-blank from unit to unit, a take-off device adapted to remove the needle from the carrier after the last unit has completed its operation, means for tripping said take-off device to transfer the needle to a tempering unit, means to actuate said operating units, means for operating said carrier, and mechanism common to all of said means to effect their operation simultaneously and in synchronism.

17. In a needle-making machine, a series of operating units, means for feeding wire to the machine and for effecting a straightening thereof, means for cutting a predetermined length of wire to form a needle-blank, means for holding the wire during the cutting operation, means for conveying the wire-holder to the first of the series of operating units to present the needle-blank thereto, and a carrier for transferring the blank thereafter to each of the units of said series successively.

18. In a needle-making machine, a machine-base, a plurality of operating units disposed longitudinally thereof, means for feeding wire to the machine and effecting a straightening thereof, means for cutting a predetermined length of wire to form a needle-blank, means for conveying the blank to the first of said operating units, a carrier having reciprocatory movement longitudinally of the base and adapted to transfer the needle-blank successively from unit to unit, means for operating said carrier, means for operating said units, and mechanism common to all said means for operating them simultaneously and in synchronism.

19. In a needle-making machine, a machine-base, a plurality of operating units disposed longitudinally thereof, means for feeding wire to the machine and effecting a straightening thereof, means for cutting a predetermined length of wire to form a needle-blank, means for conveying the blank to the first of said operating units, a carrier having reciprocatory movement longitudinally of the base and adapted to transfer the needle-blank successively from unit to unit, coacting means between the conveying means and carrier whereby the carrier imparts motion to said conveying means, means for operating said carrier, means for operating said units, and mechanism common to all said means for operating them simultaneously and in synchronism.

20. In a needle-making machine, a machine-base, a plurality of operating units disposed longitudinally thereof, each unit actuatable to produce its particular action on a needle-blank, a carrier adapted to transfer needle-blanks from unit to unit, a plurality of work-holders for receiving the needle blanks from said carrier and for presenting them to the operating units, each of said work-holders having separable jaws and means to maintain the jaws in closed position, and means common to selected work-holders for opening their jaws simultaneously.

21. In a needle-making machine, a machine-base, a plurality of operating units disposed longitudinally thereof, each unit actuatable to produce its respective action on a needle-blank to form a needle, a carrier having reciprocatory movement longitudinally of the base and adapted to transfer needles to each of said units successively, a plurality of spaced pairs of needle-carrying jaws on said carrier, individual means to maintain said jaws in closed position, and means common to all of said pairs of jaws and operable to effect their separation simultaneously.

22. In a needle-making machine, a machine-base, a plurality of operating stations disposed in spaced relation on and longitudinally of the base, each station including an operating unit and a chuck, the latter having reciprocatory movement in relation to the unit and comprising needle-holding jaws, means for actuating the several chucks toward and from their appropriate units and effecting opening and closing of the jaws at predetermined stages of their movement, a carrier having reciprocatory movement longitudinally of the base and adapted to transfer needle-blanks to each of the chucks successively, a series of spaced sets of needle-carrying-jaws on the carrier, and means for effecting opening and closing of the jaws in predetermined relation to the closing and opening of the chuck-jaws.

23. In a needle-making machine, a machine-base, a plurality of operating stations disposed in spaced relation on and longitudinally of the base, each station including an operating unit and a chuck, the latter having reciprocatory movement in relation to the unit and comprising needle-holding jaws, means for actuating the several chucks toward and from their appropriate units and effecting opening and closing of the jaws at predetermined stages of their movement, a carrier having reciprocatory movement longitudinally of the base and adapted to transfer needle-blanks to each of the chucks successively, a series of spaced sets of needle-carrying-jaws on the carrier, means for effecting opening and closing of the jaws in predetermined relation to the closing and opening of the chuck-jaws, and an initial transfer device for presenting a needle-blank to the chuck of the first station.

24. In a needle-making machine, a machine-base, a plurality of operating stations disposed in spaced relation on and longitudinally of the base, each station including an operating unit and a chuck, the latter having reciprocatory movement in relation to the unit and comprising needle-holding jaws, means for actuating the several chucks toward and from their appropriate units and effecting opening and closing of the jaws at predetermined stages of their movement, a carrier having reciprocatory movement longitudinally of the base and adapted to transfer needle-blanks to each of the chucks successively, a series of spaced sets of needle-carrying-jaws on the carrier, means for effecting opening and closing of the jaws in predetermined relation to the closing and opening of the chuck-jaws, an initial transfer device for presenting a needle-blank to the chuck of the first station, and a blank-cutting mechanism operatively associated with the transfer device and from which it transports the blank to said chuck.

25. In a needle-making machine, a machine-base, a plurality of operating stations disposed in spaced relation on and longitudinally of the base, each station including an operating unit and a chuck, the latter having reciprocatory movement in relation to the unit and comprising needle-holding jaws, means for actuating the several chucks toward and from their appropriate units and effecting opening and closing of the jaws at predetermined stages of their movement, a carrier having reciprocatory movement longitudinally of the base and adapted to transfer needle-blanks to each of the chucks successively, a series of spaced sets of needle-carrying-jaws on the carrier, means for effecting opening and closing of the jaws in predetermined relation to the closing and opening of the chuck-jaws, and compensating means associated with each chuck for insuring predetermined positioning thereof in respect to the needle-blank it is to take from carrying-jaws on the carrier.

26. In a needle-making machine, a machine-base, a plurality of operating stations disposed in spaced relation longitudinally of the base, one of said stations including a swaging unit, heating means associated therewith, a chuck movable toward and away from the unit to present a needle-blank thereto and withdraw the same therefrom, and means common to the unit, chuck and heating means for actuating them into a predetermined coacting relation and operating to apply the heating means to a needle-blank and while the same is in a predetermined position with respect to the unit.

27. In a needle-making machine, a machine-base, a plurality of operating stations disposed in spaced relation longitudinally of the base, one of said stations including a swaging unit, heating means associated therewith, a chuck movable toward and away from the unit to present a needle-blank thereto and withdraw the same therefrom, and means common to the unit, chuck and heating means for actuating them into a predetermined coacting relation whereby, after the unit has effected a swaging operation on the blank, the chuck withdraws the same therefrom and the heating means applies a flame to soften a selected portion of the blank.

28. In a needle-making machine, a machine-base, a plurality of operating stations disposed in spaced relation longitudinally of the base, one of said stations including an operating unit, means actuatable in relation thereto to present to and withdraw therefrom a needle-blank, said unit comprising means for effecting a plurality of operations on the blank including trimming the blank to needle length, forming a point thereon, and buffing a selected portion of the point-end of the blank, and mechanism for controlling the action of the trimming, pointing, and buffing means and coacting with the blank-presenting means.

29. In a needle-making machine, a machine-base, a plurality of operating stations disposed in spaced relation longitudinally of the base, one of said stations including an operating unit, a blank-presenting device actuatable in relation to the unit to introduce a needle-blank to the unit and to withdraw the same therefrom, and including means for bending one end of the blank to form a butt thereon at a predetermined stage in the operation of the device, said unit including means for forming a noucat at a selected point in the blank.

30. In a needle-making machine, a machine-base, a plurality of operating stations disposed in spaced relation longitudinally of the base, one of said stations including an operating unit, a blank-presenting device actuatable in relation to the unit, the latter including means for producing flattened surfaces on selected portions of the blank, and a cam-structure associated with said blank-presenting device to give the blank a predetermined turning movement whereby the proper portions to be flattened are presented to the flattening means.

31. In a needle-making machine, a machine-base, a plurality of operating stations disposed in spaced relation longitudinally of the base, one of said stations including an operating unit, a blank-presenting device actuatable in relation to the unit, the latter including means for producing flattened surfaces on selected portions of the blank, and means operatively associated with the blank-presenting means for giving the blank a predetermined turning movement whereby a plurality of selected portions thereof will be acted upon after the blank has been turned.

32. In a needle-making machine, a machine-base, a plurality of operating stations disposed in spaced relation longitudinally of the base, one of said stations including an operating unit and a coacting blank-presenting device having means for forming a butt at one end of the blank and a noucat intermediate the ends of the blank, another of said stations including a unit having means for flattening selected portions of the blank and a blank-presenting device actuatable in relation thereto and having means for effecting a turning movement of the blank whereby, when the latter is presented to the flattening unit, the butt and noucat will be in parallel planes to the sides to be flattened.

33. In a needle-making machine, a machine-base, a plurality of operating stations disposed in spaced relation longitudinally thereof, one of said stations comprising a beard-forming mechanism including a forming-mandrel, a turning-element actuatable to bend a selected portion of the blank over the mandrel, and means common to the mandrel and element for positioning them for the beard-forming operation; a blank-presenting device actuatable in relation to the unit and operable to introduce a selected portion of the blank to the unit; and means common to the device and unit for actuating the former at a predetermined stage of the operation of the mandrel and turning-element.

34. In a needle-making machine, a machine-base, a plurality of operating stations disposed in spaced relation longitudinally thereof, wire-straightening mechanism adjacent one end of the base, mechanism associated therewith for cutting material to predetermined needle length, an initial transfer mechanism operatively associated with the cutting-to-length mechanism and movable to transport a needle-blank from said cutting-to-length mechanism to the second of said stations; the latter including mechanism for grinding one end of the blank; another of said stations including swaging mechanism for reducing selected portions of the blank to predetermined diametral dimensions; another of said stations including mechanism for trimming the swaged blank to predetermined needle length, providing one end thereof with a point, and buffing selected portions of the pointed end; another of said stations including noucat-punching mechanism operable to produce a groove at a selected section of the blank; blank-presenting devices operatively associated with said stations for presenting the needle-blank to the respective units thereof; the device associated with the noucat-punching mechanism including means for bending one end of the blank to form a butt thereon; another of said stations including flattening mechanism operable to flatten selected portions of the blank, and a blank-presenting device operable to present the blank to the flattening mechanism and also to effect a turning movement of the blank whereby the portions flattened by said mechanism will be in a plane in parallelism with the previously formed butt and noucat; another of said stations including beard-forming mechanism comprising a forming-mandrel and a turning-element, and also including a blank-presenting device operable to present the blank to the beard-forming mechanism; a main transfer mechanism operable to transport a series of needle-blanks from station to station, receiving its first blank from the blank-presenting device of the butt-grinding unit; and operating mechanism common to said stations and main transfer mechanism for actuating the mechanism and the stations in synchronism.

35. In a needle-making machine, a machine-base, a series of operating units disposed longitudinally thereof, a series of chucks on the base, there being one chuck for each unit, and a carrier having reciprocatory movement longitudinally of the base, the said carrier having a plurality of needle-carrying jaws adapted upon reciprocation of the carrier to transfer needle-blanks from one chuck to the next and to return to initial position.

In testimony whereof we affix our signatures.

ALFRED HOFMANN.
OSWIN KANIS.